(12) United States Patent
Thissen et al.

(10) Patent No.: US 9,587,141 B2
(45) Date of Patent: Mar. 7, 2017

(54) HYDROGEN CYANIDE-BASED POLYMER SURFACE COATINGS AND HYDROGELS

(71) Applicant: COMMONWEALTH SCIENTIFIC AND INDUSTRIAL RESEARCH ORGANISATION, Campbell, Australian Capital Territory (AU)

(72) Inventors: Helmut Thissen, Clayton (AU); Richard Evans, Clayton (AU); Aylin Koegler, Rowville (AU)

(73) Assignee: Commonwealth Scientific and Industrial Research Organization (AU)

( * ) Notice: Subject to any disclaimer, the term of this patent is extended or adjusted under 35 U.S.C. 154(b) by 0 days.

(21) Appl. No.: 14/401,310

(22) PCT Filed: May 17, 2013

(86) PCT No.: PCT/AU2013/000512
§ 371 (c)(1),
(2) Date: Nov. 14, 2014

(87) PCT Pub. No.: WO2013/170308
PCT Pub. Date: Nov. 21, 2013

(65) Prior Publication Data
US 2015/0140660 A1    May 21, 2015

(30) Foreign Application Priority Data

May 17, 2012 (AU) ................................ 2012902037

(51) Int. Cl.
| | | |
|---|---|---|
| *C01C 3/10* | (2006.01) | |
| *C09D 179/02* | (2006.01) | |
| *C08G 73/06* | (2006.01) | |
| *C08G 73/02* | (2006.01) | |

(52) U.S. Cl.
CPC ............. *C09D 179/02* (2013.01); *C01C 3/10* (2013.01); *C08G 73/0206* (2013.01); *C08G 73/06* (2013.01); *Y10T 428/265* (2015.01)

(58) Field of Classification Search
None
See application file for complete search history.

(56) References Cited

U.S. PATENT DOCUMENTS

| 1,464,802 A | 8/1923 | Bohart |
| 2,069,543 A | 2/1937 | Chamberlin et al. |
| 4,252,919 A | 2/1981 | Wagner et al. |
| 5,442,023 A * | 8/1995 | Argyropoulos ....... C08F 220/28 524/558 |
| 2004/0043508 A1* | 3/2004 | Frutos .................... B82Y 30/00 436/518 |

OTHER PUBLICATIONS

Takahashi et al. "Passivation of Defect States in Surface and Edge Regions on pn-Junction Si Solar Cells by use of Hydrogen Cyanide Solutions" Cent. of Eur. J. Phys. vol. 7, No. 2, 2009, pp. 227-231.
Low et al., "Infrared Spectrum, Surface Reaction and Polymerization of Adsorbed Hydrogen Cyanide of Porous Class" The Journal of Physical Chemistry, vol. 72, No. 2, 1969, pp. 2371-2378.
Kozirovski et al., "Infra-red Spectrum and Surface Polymerization of Adsorbed HCN" Transactions of the Faraday Society, vol. 60, 1964, pp. 1532-1538.
Low et al., "Infrared Study of HCN Polymer on Alumina" J. Res. Inst. Catalysis, Hokkaido Univ., vol. 16, No. 2, 1968, pp. 535-542.
Volker "Polymere Blasaure" Angew. Chem. vol. 72, No. 11, 1960, pp. 379-384.
MacDonald et al., "Polymers from Intermediates Obtained from Hydrogen Cyanide" Journal of Polymer Science: Polymer Chemistry Edition, vol. 12, 1974, pp. 663-678.
Supplementary European Search Report to corresponding European patent application No. 13790991.7, dated Dec. 22, 2015, 9 pages.

\* cited by examiner

*Primary Examiner* — Suzanne M Noakes
*Assistant Examiner* — Stephen Chong
(74) *Attorney, Agent, or Firm* — Tarolli, Sundheim, Covell & Tummino LLP

(57) ABSTRACT

The present invention provides a process of coating at least a portion of a substrate surface comprising contacting the surface with hydrogen cyanide monomeric units under conditions permitting polymerisation of the hydrogen cyanide monomeric units to form a polymer that coats the surface. Also provided is a substrate coated by a polymer according to the claimed process. Also provided is a method of forming a hydrocyanic acid-based hydrogel, the method comprising co-polymerisation in a solution, the solution comprising hydrogen cyanide monomer units and co-monomers.

25 Claims, 7 Drawing Sheets

HYDROGEN CYANIDE-BASED POLYMER SURFACE COATINGS AND HYDROGELS

FIELD OF THE INVENTION

The present invention generally relates to polymeric coatings, more particularly, methods and processes suitable for modifying the surface of a variety of substrate materials (including organic and inorganic substrates). The present invention relates to at least partially coating (whether or not by line-of-sight coating application techniques) the surface of such substrates with a coating so as to impart an additional functional property to the surface of the substrate, which is distinct from the functional properties of the remainder of the substrate. The polymeric coating may be a prebiotic polymer.

The present invention also relates to hydrocyanic acid-based hydrogels. More particularly, the present invention relates to methods and processes suitable for preparing such hydrogels.

BACKGROUND OF THE INVENTION

In many applications it is important to differentiate between the bulk properties of a material or device and the surface properties of that material or device. The bulk or substrate material provides a set of bulk properties suitable for the intended application, such as mechanical properties or refractive properties. However, in many applications the surface properties of the substrate material are not suitable or ideal for the intended application. Accordingly, for these substrate materials surface modification is required to modify the surface properties of the substrate.

Surface modification techniques include methods such as adsorption, self-assembled monolayer (SAM) formation, functionalised silanes, Langmuir-Blodgett deposition, layer-by-layer (LbL) assembly, and covalent attachment of genetically-engineered surface-binding peptides. These techniques have limitations for widespread practical use. For instance, adsorbed coatings may desorb under certain conditions, which limits the appropriateness of adsorption as a surface modification technique in a variety of applications. Furthermore, simple adsorption is not readily applicable to a large variety of substrate materials, as the properties of the substrate are not suitable for attracting and retaining the coating polymers. Whether the properties of a substrate are appropriate will also depend on the type of polymer that is to be applied. Although covalent surface modification techniques improve adhesion, chemical specificity between interfacial modifiers and substrates (eg alkanethiols on noble metals and silanes on oxides) is typically required. The substrates and polymers available for surface modification chemistry is the primary limitation.

LbL derived coatings (Decher G. "Fuzzy Nanoassemblies: Toward Layered Polymeric Multicomposites", Science, 277, 1232-1237 (1997)) can be reliably and evenly deposited from aqueous solutions, provide good adhesion and control over the coating thickness while providing functional groups that can be used for subsequent surface immobilisation reactions and can be used for coating various substrate geometries such as porous materials and internal surfaces in a device. However, LbL assembly requires a multi-step procedure for implementation.

It would be helpful to have a simpler one-step process that provides a multi-purpose, polymeric coating that may be used in chemical, biological and material sciences, as well as in applied sciences, engineering and technology. It is desirable that the process not be limited by the substrate material or geometry and that the process has the capability to be carried out (i) under either oxidative or non-oxidative conditions, (ii) in aqueous or non-aqueous solutions, and (iii) in the gaseous phase.

Lee et al suggest that dopamine goes some way to that solution (Lee, H. et al, "Mussel-Inspired Surface Chemistry for Multifunctional Coatings", Science, 318, 426-430 (2007)). Neutralisation of the dopamine hydrochloride salt at high pH generates the free dopamine which then spontaneously polymerises to give a polydopamine coating. However, dopamine derived coatings require oxidative conditions for implementation. In addition, dopamine derived coatings are limited to liquid solution based chemistries.

The present invention seeks to ameliorate the deficiencies of the prior art in providing coatings of widespread applicability and practicality of use. Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

The present invention relates to an alternative, broadly applicable method of forming a polymeric coating on the surface of a substrate. In particular, the present invention provides, by controlling the reaction conditions, a hydrogen cyanide (or hydrogen cyanic acid) (HCN) derived coating on a surface. Such a coating is useful for example in the development of biocompatible coatings of medical devices, surface modifications of drug delivery carriers and tissue engineering scaffolds, biosensors, biofouling-resistant, industrial and consumer coatings, semiconductors, metal removal, surface catalysts, electronic properties of metals (such as deposition of coatings for work function modification) and next generation electronic displays.

In one aspect of the present invention, there is provided a polymer of hydrogen cyanide monomeric units (or 'HCMUs') that forms a coating on a substrate. The coating is in one embodiment readily and stably attached to a wide range of substrates and is adaptable to different uses, including by functionalisation or addition of co-monomers. Typically and advantageously, the coatings according to the invention are adherent to the substrate surface. The invention includes such a coating attached to a substrate. The HCMUs are reacted as building blocks for polymer film deposition on any bulk material surface (ie substrate) with a variety of surface geometries. In addition to HCN itself, HCMUs are broadly defined as compounds containing at least one nitrile functionality and at least one nucleophilic functionality, such as NH or SH, such that the compound will undergo a self-reaction or polymerisation. The NH functionality may be in the form of, but not limited to, an amine (HN—) or imine (HN=). Preferred HCMUs for the invention are those that are practically useful, namely HCN itself, and multimers of HCN including, but not limited to, $(HCN)_2$, $(HCN)_3$, and $(HCN)_4$.

Preferred isomeric forms of HCN multimers include, but are not limited to, the hydrogen cyanide dimer iminoacetonitrile HN=CH—CN (IAN), the hydrogen cyanide trimer aminomalononitrile $H.N—CH—(CN)2$ (AMN) and the hydrogen cyanide tetramer diaminomaleonitrile $H_2NC(CN)=C(CN)—NH—$ (DAMN), as well as the compound aminoacetonitrile $H_2N—CH_2—CN$ (AAN). In a particular embodiment, the HCMUs consist essentially of one or more of the monomers selected from the group consisting of HCN, IAN, AMN, DAMN, AAN, azidoacetontirile and isomers of any one of these, and typically from AMN, DAMN, AAN and isomers of any one of these. In one embodiment, the HCMUs consist essentially of one or more monomers selected from the group consisting of HCN, IAN, AMN, AAN, azidoacetonitrile and multimers of HCN. In a particularly preferred embodiment, the HCMUs consist essentially of HCN or AMN.

In one embodiment, the present invention provides a process of coating at least a portion of a substrate surface, the method comprising contacting the surface with HCMUs under conditions permitting polymerisation of the HCMUs to form a polymer that coats the surface. This process thus provides modifying the substrate surface. Typically, the HCMUs are provided in a solution which is contacted with the surface.

The conditions permitting polymerisation depend on the reactivities of the HCMUs used. The different reactivities and nature of the HCMUs can be illustrated with the following series. The HCN dimer imminoacetonitrile generated in the gas phase is stable only below ca. −40 degrees Celsius. Above this temperature it spontaneously polymerises. The HCN trimer to aminomalononitrile is stable as a sulphonic acid salt but polymerises when neutralised. Base may be used to neutralise aminomalononitrile salt. However, base is not necessarily required to initiate polymerisation. Neutralised aminomalononitrile that has been extracted from basic solution will spontaneously polymerise as it is no longer in the protonated form. The HCN tetramer diaminomaleonitrile is a stable solid compound but will generate polymer when boiled in water.

In one preferred embodiment, polymerisation of the HCMUs is controlled by regulating the pH. This is more readily achieved using HCMUs stabilised at room temperature. In one form, the solution is acidic and the pH is increased to provide conditions permitting polymerisation. Generally, the HCMUs will not polymerise to any significant extent in acidic conditions. Increasing the pH to form a more alkaline solution triggers polymerisation of the HCMUs and binding onto the substrate surface. The role of the base is to get the HCMUs into a form that permits polymerisation. Neutralisation of protonated stable HCMUs is required. The base is not primarily an initiator although it may incidentally undergo reaction with either the neutralised HCMUs or resultant polymer. In a preferred embodiment, the pH value of the solution upon contacting the surface is above 7. It is preferred that the pH is below 12. A preferred pH range for polymerisation is from 8 to 9. For example, one form of the invention is a process that provides the HCMUs in an acidic solution, to which base is added to raise the pH to form the alkaline solution. Preferably, the acid is a strong acid. Suitable acids include but are not limited to acids such as p-toluenesulfonic acid, methane sulfonic acid, trifluoroacetic acid, sulphuric acid, hydrochloric acid, nitric acid, triflic acid, and trifluoroacetic acid. Other suitable acids include, without limitation, acetic acid, phosphoric acid, and perchloric acid. Preferably the acid is one which forms a solution of HCMUs whether aqueous or non-aqueous. A suitable acid is p-toluenesulfonic acid which is a readily commercially available suitable organic acid. Suitable bases include but are not limited to sodium hydroxide (NaOH), potassium hydroxide (KOH), ammonium hydroxide ($NH_4OH$), calcium hydroxide ($Ca(OH)_2$), magnesium hydroxide ($Mg(OH)_2$), barium hydroxide ($Ba(OH)_2$), aluminium hydroxide ($Al(OH)_3$), ferrous hydroxide ($Fe(OH)_2$), ferric hydroxide ($Fe(OH)_3$), zinc hydroxide ($Zn(OH)_2$), lithium hydroxide (LiOH), 2-amino-2-hydroxymethyl-propane-1,3-diol (Tris), and ammonium di-methyl amine. Preferably, the base is NaOH or Tris, also readily commercially available suitable bases.

"Contacting" in this specification means exposing at least a portion of the substrate to the HCMUs under conditions permitting the polymer to form and attach to the substrate. A typical period of time of contacting ranges from 1 minute to 7 days; preferably 1 minute, more preferably 5 minutes to 50 hours; even more preferably 30 minutes to 24 hours. The reaction is usually conducted at about room temperature, although this will vary with the HCMUs used—the highly reactive dimer will start to polymerise at temperatures of about −40 degrees Celsius. However the more stable tetramer may require temperatures of up to about 100 degrees Celsius. In a preferred embodiment, the entire substrate is immersed or dipped in the HCMU solution. The examples below illustrate preferred contacting methods. However, a variety of techniques are employed to contact the substrate surface with the HCMU solution including, without limitation, swabbing, dip coating, spin coating, die coating, ink jet coating, spraying, screen printing (eg rotary screen printing), gravure printing, photolithographic printing and flexographic printing, micro-contact printing, and nanolithography.

"Solution" includes vapours and liquids. Liquid includes both aqueous and non-aqueous solvents, including miscible solutions of water and organic solvents such as acetone, methanol, ethanol, isopropanol, dimethylformamide and dimethylsulfoxide. Preferably, the solution is made just prior to contacting the substrate, although the solution may be stored for at least brief periods of time before use. In one embodiment, the solution is aqueous, and a base soluble in the aqueous solvent is added to raise the pH to form the alkaline solution. In an alternative embodiment, the solution is non-aqueous, and a base soluble in the non-aqueous solvent is added to raise the pH to form the alkaline solution. For example, toluenesulfonic acid may carry the HCMUs as a non-aqueous solvent, but is also miscible with water. A suitable concentration is 100 mg HCMU/mL solvent for forming a coating on a substrate.

The steps of the polymerisation process can be varied in order to suit the desired purpose. In one embodiment, the solvent (water or organic solvent or mixtures thereof), base and HCMUs may be combined and then the substrate to be coated added. In another embodiment, the solvent and base may be added together with the substrate to be coated and then the HCMUs added. Alternatively the HCMUs, solvent and substrate may be combined and then the base added to start the polymerisation and resultant coating. In another embodiment, the HCMUs and base may be added together in an aqueous solvent. An organic solvent may be added to extract neutralised HCMUs as they are formed. The neutralised HCMUs may be subsequently transferred to a substrate for coating. In this embodiment the HCMUs, which are neutralised first, are then dissolved (ie solubilised) in a suitable solvent (eg an organic solvent) and cast, sprayed or otherwise deposited on a material surface to form a coating. For example, in one embodiment, aminomalononitrile toluene sulfonic acid salt is added to an aqueous solvent, such as water, and neutralised to liberate the free base of aminomalononitrile. The free base of aminomalononitrile is extracted into an organic solvent, such as diethylether, and cast on a substrate. The organic solvent is then evaporated leaving a film of aminomalononitrile which, in the free base form, spontaneously polymerises to form a polymer that coats the surface. Separation of the neutralisation and coating steps can allow easy removal of any particulate polymer prior to film formation. It can also allow accurate concentration of neutralised HCMU in solution and make coating more precise.

In one embodiment, the substrate or surface to be coated is separate from a reaction vessel in which the polymerisation occurs so that it is removable from the vessel once coated and/or its surface is modified by the process of the invention. It is also envisaged that the substrate could include the inner surface of a vessel which also functions as the reaction vessel itself. In this latter embodiment, the vessel is preferably not comprised of glass or borosilicate glassware.

The HCMUs may also be selected from the group consisting of the HCN dimer iminoacetonitrile, aminomalononitrile derivatives, diaminomaleonitrile derivatives, aminoacetonitrile derivatives and mixtures thereof. When provided as stabilised salts with p-toluenesulfonic acid, hydrochloric acid, sulphuric acid or other acids, the HCMUs may be selected from the group consisting of aminomalononitrile p-toluenesulfonate, aminoacetonitrile hydrogen sulphate and mixtures thereof.

The HCMUs form a polymeric coating on the substrate surface. The polymer, does not necessarily have a regular structure. The polymer on the substrate surface modifies the surface so as to provide a substrate surface functionalised with amino or imino groups derived from the HCMUs. Under aqueous conditions the imine groups are hydrolysed to amine groups whereas under non-aqueous conditions a greater proportion of the imine functional groups, which are more reactive after polymerisation, are retained. In addition, alternative co-monomers to the HCMUs may also provide additional functionalisation of the coating of the substrate.

In another embodiment, the present invention provides a solvent-free vapour deposition process of modifying a substrate surface, the method comprising contacting at least a portion of the substrate with a vapour comprising HCMUs, under conditions permitting polymerisation of the HCMUs such that the substrate surface is modified. Preferably, the vapour comprises the HCN dimer iminoacetonitrile. Preferably, polymerisation is spontaneous and no catalyst is required because the dimer is highly unstable and will thermally polymerise above −40 degrees Celsius (Evans, R A et al, *JACS* 113, 7261 (1991)). "Thermally polymerise" in this specification means that the compound spontaneously polymerises on warming to room temperature. The HCN dimer iminoacetonitrile polymerises above about −40 degrees Celsius. Preferably, polymerisation using IAN is carried out at a temperature ranging from about −30 degrees Celsius to about 50 degrees Celsius, more preferably from about −20 degrees Celsius to about 40 degrees Celsius, even more preferably at about room temperature. Thus the dimer is a source of solvent free HCN polymer formed without catalyst. Preferably, the substrate surface modified by the solvent-free vapour deposition process is not glass. In a preferred embodiment, the substrate surface modified by the solvent-free vapour deposition process is removable from the reaction vessel in which the reaction is carried out.

Suitable organic substrates include but are not limited to organic substrates formed from or being thermoplastics including polyesters (eg polyethylene terephthalate (PET), fluorinated ethylene propylene (FEP) or polyethylene naphthalates), polyacrylates (eg polymethyl methacrylate or PMMA), poly(vinyl acetate) (PVAC), poly(vinylbutyral) (PVB), polyethyl acrylate) (PEA), poly(diphenoxyphosphazene) (PDPP), polycarbonate (PC), polypropylene (PP), high density polyethylene (HDPE), low density polyethylene (LDPE), polysulfone (PS), polyether sulfone (PES), polyurethane (PUR), polyamide (PA), poly(dimethylsiloxane) (PDMS), polytetrafluoroethylene (PTFE), polyvinyl chloride (PVC), polyvinylidene fluoride (PVDF), polystyrene (PSy), including tissue culture polystyrene (TCPS), polyethylene sulphide, and combinations thereof; and thermoset plastics such as cellulose derivatives, polyimide, polyimide benzoxazole, polybenzoxazole, and combinations thereof. Other suitable organic substrates include, without limitation, graphite, carbon nanotubes, fullerenes, graphene, poly(glycolic acid), poly(lactic acid), and poly(lactic-co-glycolic acid) Teflon®, and combinations thereof. Further suitable organic substrates include, without limitation, biological and biologically derived substrates such as tissues, collagens, keratins, bone derived materials, and combinations thereof.

Suitable inorganic substrates include but are not limited to inorganic substrates formed from or being quartz, glass, silica and other oxides or ceramics such as alumina, indium tin oxide (ITO), lithium tantalate ($LiTaO_3$), lithium niobate ($LiNbO_3$), gallium arsenide (GaAs), silicon carbide (SiC), langasite (LGS), zinc oxide (ZnO), aluminium nitride (AlN), aluminium oxide ($Al_2O_3$), silicon (Si), silicon nitride ($Si_3N_4$), and lead zirconium titanate (PZT), titanium oxide ($TiO_2$), niobium oxide ($Nb_2O_5$); and metals or alloys such as aluminium, copper, gold, platinum, silver, iron, copper, mercury, zinc and steel. Other suitable inorganic substrates include, without limitation, mica, diamond and nickel titanium (NiTi).

In one embodiment, the process is carried out in the presence of oxygen. Typically, the oxygen is derived from atmospheric oxygen and is naturally dissolved in the solution. In an alternative embodiment, the process is carried out in conditions substantially free from oxygen. Preferably, the solution is substantially free from oxygen by purging or degassing under reduced pressure with an inert gas. Preferably, the inert gas is nitrogen or argon.

In another embodiment, the invention relates to a process for further functionalising the surface modified substrate, wherein the process has a further step of contacting the surface modified substrate with one or more reactive moieties, wherein the reactive moiety reacts with and is bound to the modified surface. Preferably, the reactive moiety comprises nucleophiles, electrophiles or metals. Preferably, the reactive moiety is selected from the group consisting of amines, thiols, nitriles, aldehydes, imidazoles, azides, polyhexamethylene dithiocarbonate, hydrogen, hydroxyls, carboxylic acids, carboxylic esters, carboxamides, alkyl halides, benzylic halides, epoxides, thioepoxides, isocyanates (organic non-protic solvents) and combinations thereof. In this way the surface modified substrate may be functionalised with, for example, further polymers such as poly(ethylene glycol) (PEG) and biopolymers. Suitable biopolymers include but are not limited to oligonucleotides, DNA, RNA, peptides, and proteins, such as extracellular matrix proteins. Further polymers may be incorporated in the polymer coating by co-deposition before, during or after coating formation. In one embodiment, the further polymer includes one or more reactive moieties, for example an amine reactive PEG, an imine reactive PEG or an amine functionalised PEG, that reacts with and binds the surface modified substrate. In another embodiment, the surface modified substrate is first functionalised with one or more reactive moieties and then functionalised with a further polymer that reacts with and binds the reactive moiety(ies). For example, the surface modified substrate may be functionalised with a compound that includes two or more amine moieties (eg polyallylamine or an amine-terminated dendrimer) such that at least one of the amine moieties reacts with and binds the surface modified substrate, and at least one of the amine moieties is free to bind the further polymer. Suitable further polymers include but are not limited to monomethoxy-PEG-aldehyde, PEG-N-hydroxysuccinimide ester, carboxyl-modified PEG, other amine-reactive PEGs and mixtures thereof. In this way, the properties of the surface modified substrate may be further modified. In one embodiment, the surface modified substrate is non-cell adherent. In this embodiment, the substrate may be coated with a polymer formed from HCMUs and functionalised with a further polymer, such as PEG, according to any one of the processes described above. In an alternative embodiment, the surface modified substrate is cell adherent. In this embodiment, the substrate is coated with a polymer formed from HCMUs.

Nanoparticles may also be incorporated in the polymer coating by co-deposition before, during or after coating formation. The nanoparticles may be either or both of nanoparticles independently produced and nanoparticles formed in addition to the coating by the HCMUs. Suitable nanoparticles include but are not limited to crosslinked polystyrene, other organic polymers, silica, quantum dots, and metal particles.

Substrates treated with a solution of HCMUs are reactive with organic heteroatoms such as amine and thiol groups (originating from an appropriate sulphur-containing co-monomer) and also strongly bind to various metals such as Au, Ag, Pt, Fe, Cu, Hg and Zn. Metals may be incorporated in the polymer coating by co-deposition before, during or after coating formation. Metals may be deposited on or in the surface modified substrate in various oxidation states. For example, in one embodiment, the process involves contacting at least a portion of the surface modified substrate with a solution of $AgNO_3$ to incorporate silver onto the surface modified substrate. In this embodiment silver is deposited on the surface modified substrate in $Ag^{(0)}$ and $Ag^{(+)}$ oxidation states. In this way, the properties of the surface modified substrate may be further modified. In this particular embodiment, the coating including silver has enhanced antimicrobial properties.

The solution of HCMUs of the present invention can also include one or more fillers, pigments, wetting agents, viscosity modifiers, stabilizers and anti-oxidants. The solution of HCMUs may also include one or more of nanoparticles, biopolymers, and metals. Moreover, as explained in more detail below, the HCMU solution may also contain additional components which may act as ligands (eg as a reactive group binding to a functional group within the polymer coating such as exemplified in example 4 below), cross-linking agents (eg that cross-link to the polymer network in addition to the HCMUs) and also co-monomers that polymerise with the HCMUs. The HCMUs can also be cross-linked with co-monomers if desired. The co-monomers may be present in the HCMU solution. Alternatively, the co-monomers may be present on the substrate surface such that the HCMUs form a co-polymeric coating on the substrate surface incorporating co-monomers present on or in the substrate surface. Co-monomers that are suitable are generally those that may react with amines, active methylene compounds or activated nitriles. Examples of such co-monomers without limiting the scope of the invention are compounds containing amines (primary or secondary), thiols, acrylates, methacrylates, epoxides, thioepoxides, isothiocyanates alkyl halides and arylmethyl halides.

The invention extends to a substrate coated by a polymer according to any one of the processes described above. In a preferred embodiment, the polymer provides a smooth, continuous polymeric coating on the substrate surface, the polymeric coating having a substantially constant thickness (ie ±20%). A suitable means for measuring the coating thickness is atomic force microscopy (AFM). As a general guide, the polymeric coating exists on the substrate surface in an average thickness ranging from 1 to 1000 nm, preferably ranging from about 2 to 400 nm, more preferably ranging from about 5 to 200 nm, more preferably from about 20 to 200 nm, in one embodiment 10 to 100 nm. A suitable average thickness is about 45 nm, 50 nm or 175 nm with a root mean squared (rms) roughness value of about 10 nm or less. A coating is of substantially constant thickness if its rms value is less than about ±20% the average thickness.

In one embodiment, the invention relates to a method of coating a substantially planar substrate, including but not limited to microscope slides, cell culture plates and flasks. In another embodiment, the invention relates to a method of coating particles. In this case the polymer coats particles that may be derived from inorganic or organic materials. Examples of particles, without limiting the invention, include crosslinked polystyrene, other organic polymers, silica, quantum dots, metal particles etc. The diameter of the particles may range from a few nanometres to several millimetres. The particles may also act as a sacrificial scaffold such that the coating will become a hollow capsule upon dissolution of the particle. For example, a silica particle that is coated with the polymer of the invention may be dissolved using hydrofluoric acid.

In another embodiment, the invention relates to a method of coating porous materials. In this case the polymer evenly coats the material throughout the porous structure as well as on the outer surface as a result of the HCMU solution contacting the surface by moving into the porous structure where polymerisation occurs. The porosity may range from the nanometer scale to the centimeter scale. Suitable materials of larger scale porosity include but are not limited to bone, porous metals or metal alloys, zeolites and porous polymers with interconnected porosity.

The ability to coat porous materials is useful in a variety of fields. For example, the zeolites allows their use in the selective removal of metal ions from solution or selective removal of components in a gas mixture. Carbon dioxide capture and release in framework materials for sequestration applications is particularly important. Larger scale porosity materials such as bone, porous metals, metal alloys and porous polymers can be coated advantageously to provide an improved tissue response for example in implantable medical devices, in particular in bone related applications.

In another embodiment, the invention relates to a method of forming a hydrocyanic acid-based hydrogel, the method comprising co-polymerisation in a solution, the solution comprising HCMUs and co-monomers. In this way, a polymer of HCMUs is formed without the need for a substrate. Preferably, the co-monomers are selected from a compound that comprises one or more functional groups that react with an amine, nitrile, any intermediate formed in the polymerisation of HCN, or a combination thereof. These co-monomers may impart additional functionality on the resulting hydrogel. In a particularly preferred embodiment, the co-monomers are selected from compounds that comprise one or more amine functional groups selected from the group consisting of polyallylamines, polyethyleneimines and combinations thereof. This leads to the formation of crosslinked polymer networks to produce materials such as hydrogels.

The solution of HCMUs and co-monomers can also include one or more fillers, pigments, wetting agents, viscosity modifiers, stabilizers and anti-oxidants. The solution of HCMUs and co-monomers may also include one or more of nanoparticles, biopolymers, and metals. Preferably, the biopolymers are selected from the group consisting of one or more of proteins, peptides, oligonucleotides, DNA, RNA, and combinations thereof. For example, one process is to provide the HCMUs and co-monomers in an acidic solution, to which base is added to raise the pH to form the alkaline solution. Nanoparticles may also be incorporated in the hydrogel by co-polymerisation during hydrogel formation or deposition on the hydrogel after hydrogel formation. The nanoparticles may be either or both of nanoparticles independently produced and nanoparticles formed in addition to the coating by the HCMUs.

The invention extends to a hydrocyanic acid-based hydrogel formed by the method described above. Such a hydrogel may have additional components as described in this specification to impart various functionalities to it. The invention also extends to a process of coating at least a portion of a substrate surface, the method comprising contacting the surface with a hydrocyanic acid-based hydrogel, to coat the portion of the surface.

In another embodiment, the invention relates to a kit for modifying a substrate surface, the kit comprising a solution comprising HCMUs and instructions for use. Preferably, the kit also comprises a base or a base and an accelerant. Suitable accelerants include but are not limited to (i) aldehyde/ketones such as formaldehyde, acetaldehyde and acetone (ii) cyanohydrins derived from the above, carbonyl compounds such as glycolonitrile, acetalaldehyde cynaonohydrin, acetone cyanohydrin and (iii) metal salts such as metavanadates. A kit according to the invention may further comprise a reactive moiety selected from the group consisting of thiols, amines, nitriles, aldehydes, imidazoles, azides, halides, polyhexamethylene dithiocarbonate, hydrogen, hydroxyls, carboxylic acids, carboxylic esters, carboxamides or a combination thereof.

As used herein, except where the context requires otherwise, the term "comprise" and variations of the term, such as "comprising", "comprises" and "comprised", are not intended to exclude further additives, components, integers or steps.

It will be understood that the invention disclosed and defined in this specification extends to all alternative combinations of two or more of the individual features mentioned or evident from the text or drawings. All of these different combinations constitute various alternative aspects of the invention.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
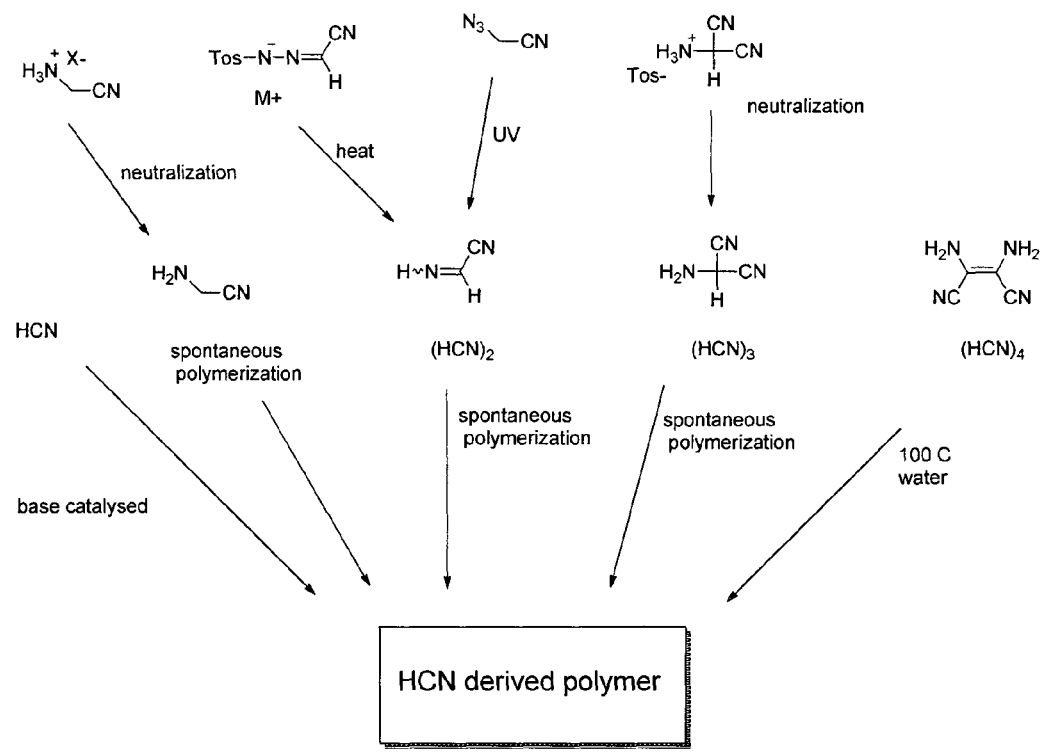
FIG. 1: Reaction schematic for HCN polymer formation using various HCMUs. Exemplary isomeric forms of various HCN multimers are shown (HCN; AAN; IAN as an example of $(HCN)_2$; AMN as an example of $(HCN)_3$; DAMN as an example of $(HCN)_4$). $X^-$ is a counter anion, preferably derived from an acid. Suitable acids include but are not limited to acids such as sulphuric acid, hydrochloric acid, nitric acid, triflic acid, trifluoroacetic acid, p-toluenesulfonic acid, methane sulfonic acid, acetic acid, phosphoric acid, and perchloric acid. $M^+$ is a cation. Suitable cations include but are not limited to cations such as $Li^+$, $Na^+$ $K^+$ as well as multivalent cations.

It is known that some HCMUs spontaneously polymerise in an alkaline environment to yield polymeric products. Aqueous polymerisation of HCMUs yields two fractions; (i) a coloured aqueous solution, and (ii) a precipitate. The solution is believed to comprise water soluble HCN oligomers. One form of the precipitate is insoluble particles of HCN polymers. The structures of the soluble and precipitate fractions that form from the aqueous polymerisation of hydrocyanic acid have not been definitively established. The insoluble particles have been described as dark in U.S. Pat. No. 2,894,916 and U.S. Pat. No. 2,579,061. HCN adsorption to a substrate surface has been studied in Kozirovski, Y. et al "Infrared Spectrum and Surface Poklymerization of Adsorbed HCN" *Transactions of the Faraday Society* (1964) Vol 60, p 1532-1538; and Low, M. et al "Infrared Spectrum, Surface Reaction, and Polymerization of Adbsorbed Hydrogen Cyanide on Porous Glass" *J. Phys. Chem.* (1968) Vol 72, p 2371-2378. Further, HCN adsorption to a silicon substrate surface to passivate Si dangling bonds has also been studied in Takahashi, M. et al "Passivation of defect states in surface and edge regions on pn-junction Si solar cells by use of hydrogen cyanide solutions" *Cent. Eur. J. Phys.* (2009).

In this invention, a substrate is contacted with an alkaline solution comprising HCMUs to form an adherent polymeric HCN derived film coated on the substrate. One process is to provide the HCMUs in an acidic solution, to which base is added to raise the pH to form the alkaline solution. For example, the pH of an AMN toluenesulfonate solution may be raised to eg pH 8-9 using aqueous NaOH. Neutralisation of the acid initiates the polymerisation reaction. Similarly, this can be achieved using a solution containing potassium cyanide and ammonium chloride. Preferably, the solution contains similar molar amounts of potassium cyanide and ammonium chloride.

In another process, the HCMUs are in the gaseous phase and polymerisation spontaneously occurs above a certain temperature. This method does not require a catalyst, ie a base.

In order to form a homogeneous polymeric coating, it is desirable to minimise the formation of particulates on the substrate surface, which may be achieved by one or more of:
keeping the polymerisation and coating process short. Here, the formation of a coating proceeds to the point before the formation of particulates in solution;
repeatedly starting the polymerisation and coating process, followed by washing. In each cycle, the formation of the coating proceeds before the formation of particulates in solution; and
utilising the different density and mobility of the dark particulate material to separate particulates from the coating, for example by placing the substrate in the solution, facing down (precipitating particles fall down) or a similar system (eg involving centrifugal force on the particulates).

However, in some embodiments, the roughness afforded by having particles is easily obtained by having the substrate surface facing up in the polymerisation solution to allow particulates to fall onto the surface and to be incorporated into the surface coating.

Surface roughness can also be controlled by the nature of the deposition conditions. For example, depositions performed under an inert atmosphere (oxygen free) will result in an increased roughness of the coating. An increase in surface roughness provides substrate materials with an increased surface area which is beneficial in some material science applications. Control over surface roughness also affects biological response and may be modulated to control that response. For example, cellular responses can be influenced by surface roughness.

Additional compounds can be added to speed the rate of polymerisation. These include (i) aldehyde/ketones such as formaldehyde, acetaldehyde and acetone (ii) cyanohydrins derived from the above carbonyl compounds such as glycolonitrile, acetalaldehyde cynaonohydrin, acetone cyanohydrin and (iii) metal salts such as metavanadates.

As outlined above, different HCMUs may be used and mixtures of them are also suitable. HCN, IAN, AMN, DAMN, AAN, azidoacetonitrile and isomers of any one of these may be used. DAMN breaks down to form AMN. The larger monomeric units are more stable physically and chemically. To illustrate the different but related pathways, FIG. 1 is a reaction schematic of different possible HCMUs.

The structure of the polymer coating may be controlled by varying:
the amount of oxygen present in solution—in the presence of oxygen a more uniform coating forms, in the absence of oxygen (ie oxygen concentration <0.1%, purged with an inert gas such as $N_2$ or Ar) a coating with increased surface roughness forms and particles deposit on the surface;
the time for polymerisation/deposition time;
the solution concentration of HCMUs;
the type of buffer or solvent used.

The polymer coating can be characterised by X-ray photoelectron spectroscopy (XPS) analysis. Here, the distinctive N/C ratios can be used to validate the presence of the coating. O/C ratios can also be measured but the N/C ratio is useful given the relatively high nitrogen content of the polymer coating. For AMN, N/C ratios of the coating range between about 0.4 and 0.7, preferably between about 0.550 and 0.650. For DAMN, N/C ratios of the coating are typically around 0.508.

The polymer coating can also be characterised by water contact angle measurement analysis. Here, the distinctive contact angles can be used to validate the presence of the coating. Water contact angles of the coating range between about 50 and 60 degrees, preferably between about 52 and 58 degrees, more preferably between about 53.1 and 57.8 degrees.

The thickness of the coating may be controlled by varying eg the deposition time or solution concentration.

As outlined above, the solution of HCMUs may include ligands comprising functional groups. Thus, additional functional groups may be incorporated by either or both of (i) incorporating the additional functional group as a co-monomer with the HCMU and (ii) contacting the surface with the additional group under conditions permitting it to react with the surface coating. In this way, the substrate surface may be further functionalised with ligands comprising functional groups. Preferably, the functional groups comprise nucleophiles, electrophiles or metals. Preferably, the functional groups are selected from the group consisting of amines, thiols, nitriles, aldehydes, imidazoles, azides, polyhexamethylene dithiocarbonate, hydrogen, hydroxyls, carboxylic acids, carboxylic esters, carboxamides, alkyl halides, benzylic halides, epoxides, thioepoxides, isocyanates (organic non-protic solvents) and combinations thereof. These reactions can occur spontaneously or a catalyst (ie base) may be required depending on the reaction carried out.

Hydrogels

HCMUs may alternatively be co-polymerised with ligands comprising multiple (more than one) functional groups to form hydrogels. Co-monomers may be selected from compounds that comprise one or more functional groups that react with an amine, nitrile, any intermediate formed in the polymerisation of HCN, or a combination thereof. Preferably, the functional groups are selected from the group consisting of thiols, aldehydes, ketones, epoxides, acrylates, methacrylates, isocyanates, alkyl halides, amines, cyanohydrins and combinations thereof. More preferably, the functional groups are amines. Preferably, the amine functional groups are selected from the group consisting of polyallylamines, polyethyleneimines and combinations thereof.

Hydrogels can be formed without the need for a substrate and could be subsequently attached to a substrate or a portion thereof to form a coating.

EXAMPLE 1

Deposition of AMN Coatings in a PBS Buffer Solution

Aminomalononitrile p-toluenesulfonate (AMN) (Aldrich, 98%) was dissolved in phosphate buffered saline (PBS) with a pH of 7.4 at a concentration of 100 mg/mL. To coat glass cover slip samples, the glass cover slip samples were incubated in this solution for 24 h after polymerisation was induced by adjusting the pH of the solution to 8.5 using 0.1 M sodium hydroxide (NaOH). Subsequently, samples were washed five times with MilliQ™ water and then incubated overnight in MilliQ™ water before being air dried in a laminar flow cabinet. The presence of the coating was indicated by a light brown colour change. In cases where surface coatings with a low roughness were desired, samples were facing downwards during the coating process to avoid the precipitation of polymer, which was also formed in solution.

Coatings were successfully deposited on a variety of substrate materials. These coatings were adherent to the surface after several washing cycles. Table 1 shows X-ray photoelectron spectroscopy (XPS) data collected on different substrate materials before and after coating with AMN. In each case, the XPS results clearly demonstrate the deposition of a coating, with a significant change in the elemental composition. The similar elemental ratios obtained after deposition of the AMN coating on different substrate materials also suggests that the coating composition is independent of the substrate material. In addition, the complete attenuation of signals originating from the substrate material observed on some substrate materials demonstrates that a consistent, pinhole-free coating was obtained.

TABLE 1

XPS results obtained on poly(ethylene terephthalate) (PET), polyethersulfone (PES), Mica and glass substrate materials before and after coating with AMN. The average atomic ratios are presented (n = 3).

| Substrate | O/C | N/C | Other |
|---|---|---|---|
| PET | 0.344 ± 0.003 | — | — |
| PET-AMN | 0.244 ± 0.005 | 0.637 ± 0.003 | — |
| PES | 0.220 ± 0.011 | — | 0.066 ± 0.003 (S/C) |
| PES-AMN | 0.234 ± 0.006 | 0.627 ± 0.006 | — |
| Mica | 5.739 ± 0.242 | — | 1.348 ± 0.051 (Si/C) |
| Mica-AMN | 0.248 ± 0.002 | 0.618 ± 0.012 | — |
| Glass | 2.857 ± 0.048 | 0.036 ± 0.005 | 1.203 ± 0.007 (Si/C) |
| Glass-AMN | 0.234 ± 0.002 | 0.600 ± 0.006 | — |

This example demonstrates that the polymerisation of aminomalononitrile p-toluenesulfonate (AMN) under basic conditions can be exploited to produce adherent coatings on a variety of substrate materials, including polymers and inorganic substrate materials.

EXAMPLE 2

Control Over the Coating Thickness

Mica samples were freshly cleaved to provide a flat substrate for thickness measurements. Subsequently, one drop of a 10% (w/v) solution of poly(D,L-lactide) in acetone was placed on the mica samples and the solvent was allowed to evaporate in a laminar flow cabinet. Aminomalononitrile p-toluenesulfonate (AMN) (Aldrich, 98%) was dissolved in phosphate buffered saline (PBS) with a pH of 7.4 at a concentration of 100 mg/mL. To coat the mica samples, the samples were incubated in this solution for different periods of time after polymerisation was induced by adjusting the pH of the solution to 8.5 using 0.1 M sodium hydroxide (NaOH). Subsequently, samples were washed five times with MilliQ™ water and then incubated overnight in MilliQ™ water before being air dried in a laminar flow cabinet. The presence of the coating was indicated by a light brown colour change. During the coating process samples were facing downwards to avoid the precipitation of polymer from solution.

Figure 2:
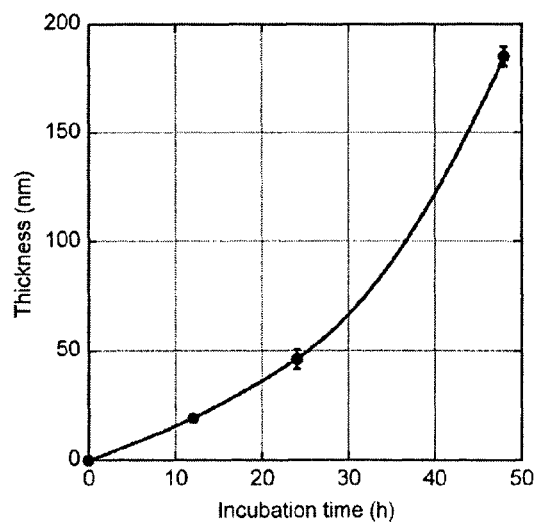
FIG. 2: The average coating thickness obtained on Mica substrates as a function of the deposition time as measured by AFM (n=3). The line has been drawn to guide the eye.

After removing the poly(D,L-lactide) masks to expose the underlying Mica surface again, atomic force microscopy (AFM) experiments (Asylum Research MFP-3D, Santa Barbara, USA) were used to determine the coating thickness using the section analysis function. The thickness measurements obtained (FIG. 2) clearly demonstrate that the coating thickness is a function of the deposition time.

Figure 3:
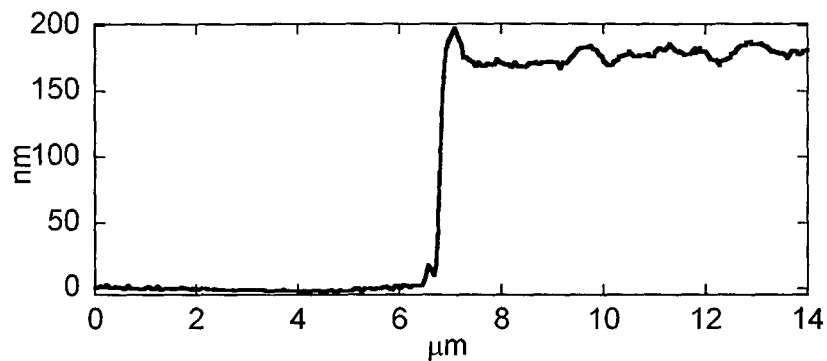
FIG. 3: AFM section analysis of an AMN coating deposited on Mica for 48 h. The section analysis was performed in an area where a mask was present during the coating process which was later removed to expose the untreated Mica surface.

Furthermore, AFM section analysis experiments revealed a consistent, pinhole-free coating for all of the deposition time points investigated (12 h, 24 h, 48 h). This is demonstrated in FIG. 3, which shows the section analysis of a coating deposited for 48 h.

Coating thickness measurements obtained by atomic force microscopy (AFM) experiments on freshly cleaved Mica substrates (FIG. 2) clearly demonstrated that the coating thickness is a function of the deposition time. Therefore, the coating thickness can be easily controlled by choosing a suitable deposition, time. Importantly, AFM section analysis experiments also demonstrated that consistent, pinhole-free coatings were obtained. The section analysis in FIG. 3 was obtained after a deposition time of 48 h in an area where a mask was present during the coating process and later removed to expose the untreated Mica surface again.

EXAMPLE 3

Consistent Coatings can be Achieved on a Variety of Different Substrate Materials Aminomalononitrile p-toluenesulfonate (AMN) (Aldrich, 98%) was dissolved in phosphate buffered saline (PBS) with a pH of 7.4 at a concentration of 100 mg/mL. To coat various substrate materials including polymers, inorganic materials and metals, the different substrate materials were incubated in this solution for 24 hours after polymerisation was induced by adjusting the pH of the solution to 8.5 using 0.1 M sodium hydroxide (NaOH). Subsequently, samples were washed five times with MilliQ™ water and then incubated overnight in MilliQ™ water before being air dried in a laminar flow cabinet. The presence of the coating was indicated by a light brown colour change. During the coating process samples were facing downwards to avoid the precipitation of polymer from solution.

Figure 4:
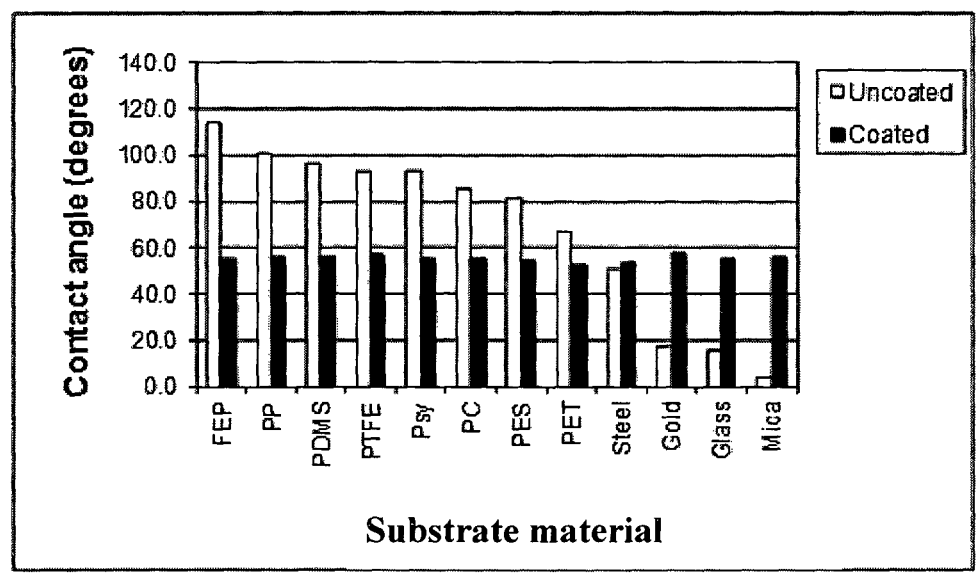
FIG. 4: Average water contact angle measurements obtained on fluorinated ethylene propylene (FEP) polymer, polypropylene (PP), polydimethylsiloxane (PDMS), polytetrafluoroethylene (PTFE), polystyrene (PSy), polycarbonate (PC), polyethersulfone (PES), poly(ethylene terephthalate) (PET), steel, gold, glass and Mica before and after coating with AMN polymer (n=10).

Static contact angles were measured across different points on samples before and after coating using an automated contact angle goniometer (KSV Instruments LTD). A droplet with a volume of approximately 5 µL of ultrapure MilliQ™ water was used for the experiments. Average contact angles were calculated from 10 measurements, with each measurement recording the contact angles on both sides of the droplet. Table 2 and FIG. 4 show the average water contact angle measurements obtained on different substrate materials before and after coating with the AMN polymer. Even though the water contact angle varied considerably on uncoated samples, no significant difference was observed between water contact angles measured after the coating was applied, indicating that the coating method is transferable between a variety of different substrate materials.

TABLE 2

Average water contact angle measurements obtained on fluorinated ethylene propylene (FEP) polymer, polypropylene (PP), polydimethylsiloxane (PDMS), polytetrafluoroethylene (PTFE), polystyrene (PSy), polycarbonate (PC), polyethersulfone (PES), poly(ethylene terephthalate) (PET), steel, gold, glass and Mica before and after coating with AMN polymer (n = 10).

| Substrate material | Contact angle before coating (°) | Contact angle after coating (°) |
|---|---|---|
| FEP | 114.3 | 55.6 |
| PP | 100.8 | 56.3 |
| PDMS | 96.6 | 56.1 |
| PTFE | 93.1 | 56.9 |
| PSy | 92.9 | 55.5 |
| PC | 85.6 | 55.6 |
| PES | 81.2 | 54.3 |
| PET | 67.0 | 53.1 |
| Steel | 51.2 | 53.7 |
| Gold | 17.1 | 57.8 |
| Glass | 15.6 | 55.5 |
| Mica | 3.9 | 56.3 |

Water contact angle measurements obtained on a variety of different substrate materials including polymers, metals and inorganic substrates before and after AMN coating revealed large differences in the contact angles of the untreated substrate materials. However, no significant difference was observed between water contact angles measured after the AMN coating was applied. This clearly demonstrates that the coating method is transferable between a variety of different substrate materials.

EXAMPLE 4

Incorporation of Amine Functionalised Compounds into AMN Coatings

Aminomalononitrile p-toluenesulfonate (AMN) (Aldrich, 98%) was dissolved in phosphate buffered saline (PBS) with a pH of 7.4 at a concentration of 80 mg/mL. 2,2,2-trifluoroethylamine (TFEA) (Aldrich) was added to this solution at a concentration of 20 mg/mL. Polystyrene (PSy) discs were used as the substrate material. To coat the polystyrene (PSy) discs, the discs were incubated in this solution for 24 h after polymerisation was then induced by adjusting the pH of the solution to 8.5 using 0.1 M sodium hydroxide (NaOH). Subsequently, to samples were washed five times with MilliQ™ water and then incubated overnight in MilliQ™ water before being air dried in a laminar flow cabinet. The presence of the coating was indicated by a light brown colour change. During the coating process samples were facing downwards to avoid precipitation of polymer from solution onto the surfaces.

The presence of the TFEA in the coating was demonstrated by XPS (Table 3). The presence of fluorine in the coating demonstrates that compounds containing amine functional groups can be incorporated into the coating during the deposition process.

TABLE 3

XPS results obtained on polystyrene (PSy) substrates after deposition of an AMN coating and deposition of an AMN coating that was deposited in the presence of TFEA. The average atomic ratios are presented (n = 3).

| Substrate | O/C | N/C | F/C |
|---|---|---|---|
| PSy-AMN | 0.206 ± 0.003 | 0.577 ± 0.039 | — |
| PSy-(AMN-co-TFEA) | 0.211 ± 0.005 | 0.526 ± 0.006 | 0.007 ± 0.001 |

This example demonstrates that amine containing compounds can be incorporated into AMN coatings simply by being present in the coating solution during the coating deposition process.

EXAMPLE 5

Different Coating Morphology Depending on Coating Conditions

Aminomalononitrile p-toluenesulfonate (AMN) (Aldrich, 98%) was dissolved in phosphate buffered saline (PBS) with a pH of 7.4 at a concentration of 100 mg/mL. A part of this solution was transferred into a glove box which provided an inert nitrogen atmosphere (<0.1% $O_2$). The remaining oxygen was removed from this solution by bubbling the solution with nitrogen gas for 1 hour. To coat glass cover slip samples, the samples were incubated in either (i) the solution stored in an inert atmosphere or (ii) the solution in air, for 24 h after polymerisation was induced by adjusting the pH to 8.5 using 0.1 M sodium hydroxide (NaOH). Subsequently, samples were washed five times with MilliQ™ water and then incubated overnight in MilliQ™ water before being air dried in a laminar flow cabinet. The presence of the coating was indicated by a light brown colour change in the case of the oxygen containing atmosphere and a darker, black colour change in the case of the nitrogen containing atmosphere.

The samples were then mounted on an aluminium stub with double-sided conductive carbon tape. Samples were then iridium coated using a Polaron SC5750 sputter coater. The thickness of the iridium coating was approximately 10 nm. Once coated, the samples were placed into a Philips XL30 Field Emission Scanning Electron microscope (FE-SEM) for imaging. An accelerating voltage of 2 kV was used to obtain images.

Figure 5:
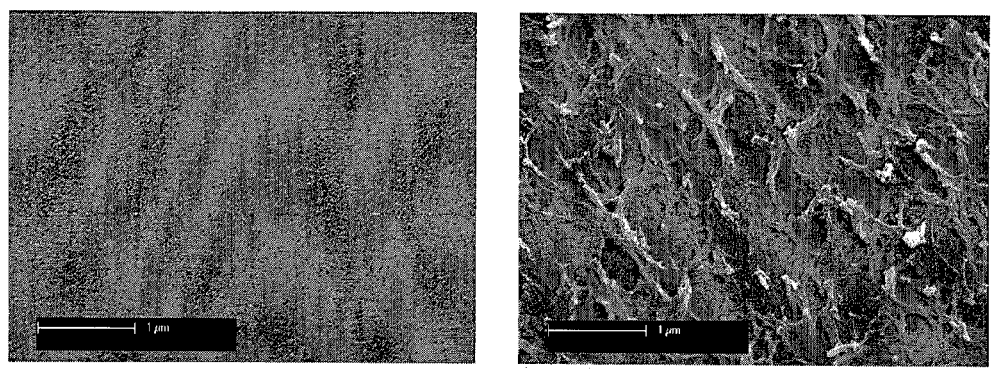
FIG. 5: SEM images obtained on AMN based coatings in air (A) and in a nitrogen atmosphere (B).

FESEM experiments (FIG. 5) revealed a smooth surface coating in the case of the oxygen containing atmosphere and a rough surface coating with a substantially higher surface area in the case of the nitrogen containing atmosphere.

This example demonstrates that different coating morphologies can be obtained depending on the environmental conditions during the deposition of coatings. Control over the surface morphology is important in a broad range of coating applications, including applications where control over the surface area is required.

EXAMPLE 6

AMN Coatings for Enhanced Cell Attachment

Aminomalononitrile p-toluenesulfonate (AMN) (Aldrich, 98%) was dissolved in phosphate buffered saline (PBS) with a pH of 7.4 at a concentration of 100 mg/mL. To coat 96 well plates having an Ultra-low attachment (ULA) coating (Corning, USA), the plates were incubated in this solution for 24 h after polymerisation was induced by adjusting the pH of the solution to 8.5 using 0.1 M sodium hydroxide (NaOH). Subsequently, samples were washed five times with MilliQ™ water and then incubated overnight in MilliQ™ water before being air dried in a laminar flow cabinet. The presence of the coating was indicated by a light brown colour change. During the coating process samples were facing downwards to avoid the precipitation of polymer from solution.

L929 mouse fibroblasts (cell line ATCC-CCL-1, Rockville, USA) were used to investigate the cellular response to modified surfaces. Cells were cultured in minimum essential medium (MEM) containing 10% foetal bovine serum and 1% non-essential amino acids (Invitrogen, USA). After cell seeding on tissue culture polystyrene (TCPS) 96 well plates (Nunclon Δ, Nunc), Ultra-low attachment (ULA) coated 96 well plates (Corning, USA) and AMN coated ULA 96 well plates (ULA-AMN) at a density of $2.5 \times 10^4$ cells/cm$^2$, samples were incubated for 24 hours at 37° C. in humidified air containing 5% $CO_2$.

Subsequently substrates were washed once with minimum essential medium (MEM) before a solution consisting of 100 μL phenazine methosulfate (PMS) solution (0.92 mg/mL in DPBS), 2 mL 3-(4,5-dimethylthiazol-2-yl)-2,5-diphenyltetrazolium bromide (MTS) solution (2 mg/mL in DPBS), and 10 mL MEM was added. The substrates were incubated for 3 hours at 37° C. in humidified air containing 5% $CO_2$ before a colorimetric readout was performed at 490 nm and 655 nm.

Figure 6:
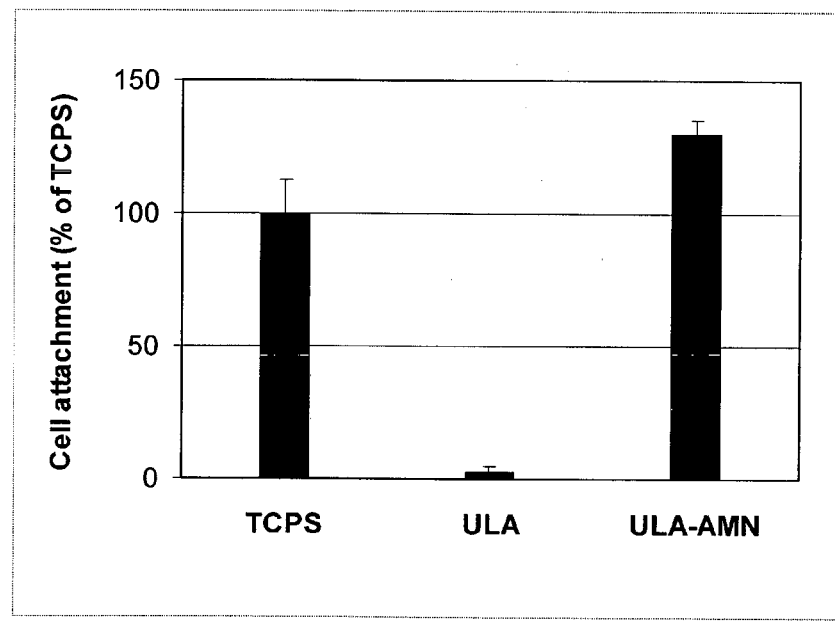
FIG. 6: Cell attachment results obtained from colourimetric tests performed on 96 well plates relative to TCPS in % (n=8).

Table 4 and FIG. 6 show the colourimetric assay results obtained on the different coatings. Cell attachment was reduced to 2.6% on the ULA coating relative to the tissue culture polystyrene (TCPS) surface. On the other hand, cell attachment increased to 130.0% on the AMN coated ULA coating relative to TCPS. No cytotoxic effect originating from the coating was observed during cell culture experiments. The data demonstrate that AMN coatings can be used for applications where high cell attachment is required.

TABLE 4

Cell attachment results obtained from colourimetric test performed on 96 well plates relative to TCPS in % (n = 8).

| Sample | Cell attachment relative to TCPS (%) |
|---|---|
| TCPS | 100.0 ± 12.9 |
| ULA | 2.6 ± 2.2 |
| ULA-AMN | 130.0 ± 5.2 |

The cell culture results clearly demonstrate that AMN coatings lead to high cell attachment and are suitable for the culture of cells in serum containing media. This high cell attachment is thought to be related to the adsorption of proteins from the cell culture medium. The cell culture results obtained on the ULA and the ULA-AMN surface also demonstrate that the AMN coating is able to mask the properties of the underlying substrate material very effectively.

As outlined above, surface roughness of the polymer coating can be controlled by the nature of the deposition conditions. For example, depositions performed under an inert atmosphere (oxygen free) results in an increased roughness of the coating, which may be of benefit in the control of biological response, for example, cellular responses.

EXAMPLE 7

Metallisation of AMN Substrates

Aminomalononitrile p-toluenesulfonate (AMN) (Aldrich, 98%) was dissolved in phosphate buffered saline (PBS) with a pH of 7.4 at a concentration of 100 mg/mL. To coat glass cover slip samples, the samples were incubated in this solution for 24 h after polymerisation was induced by adjusting the pH of the solution to 8.5 using 0.1 M sodium hydroxide (NaOH). Subsequently, samples were washed five times with MilliQ™ water and then incubated overnight in MilliQ™ water before being air dried in a laminar flow cabinet. The presence of the coating was indicated by a light brown colour change.

Cover glass slips coated with the coating were incubated in a 50 mM aqueous solution of silver nitrate ($AgNO_3$) (Chem Supply) over 16 h at room temperature, followed by extensive repeated washing over 4 h in MilliQ™ water and drying in a laminar flow cabinet.

Figure 7:
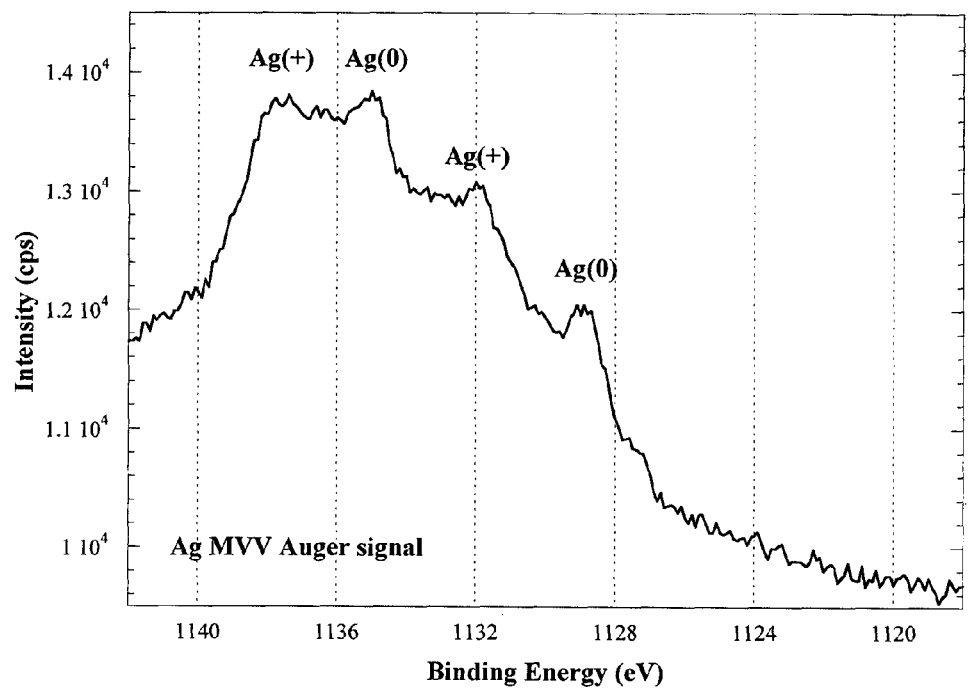
FIG. 7: The deposition of Ag in two different states of oxidation on the AMN coating is revealed by XPS.

Coated samples showed a visible grey colour change, suggesting the deposition of metallic silver. This observation was confirmed by XPS experiments which revealed an average Ag/C ratio of 0.183 (Table 5). Furthermore, XPS experiments also revealed the deposition of Ag in two different states of oxidation, $Ag^{(0)}$ and $Ag^{(+)}$, as indicated from distinct peaks in the Ag MVV Auger spectrum (FIG. 7). The figure shows the association of different states of oxidation with the different peaks observed in the high resolution spectrum.

TABLE 5

XPS results obtained on AMN coated glass substrates before and after incubation with $AgNO_3$. The average atomic ratios are presented (n = 3).

| Substrate | Ag/C |
|---|---|
| Glass-AMN | — |
| Glass-AMN-Ag | 0.205 ± 0.004 |

The metal containing coatings are useful in a broad range of applications, including electroactive applications. In biomedical applications, the deposition of elemental silver (Ag and/or $Ag^{(+)}$ is useful due to its broad antimicrobial properties.

EXAMPLE 8

Gel Formation

Figure 8:
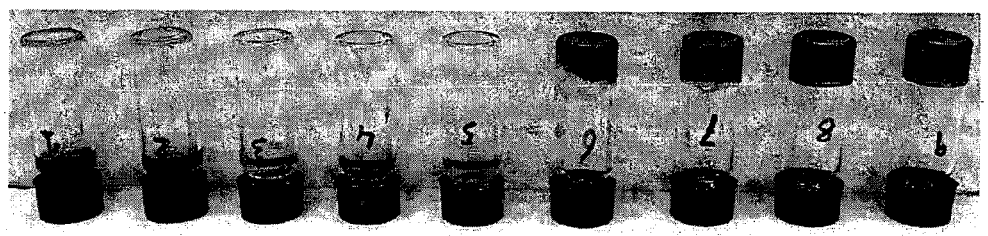
FIG. 8: The formation of crosslinked gels without the need for a substrate is observed after incubating solutions containing different ratios of AMN and polyallylamine (PAA) at pH 8.5.

Aminomalononitrile p-toluenesulfonate (AMN) (Aldrich, 98%) and polyallylamine (PAA) (MW 70,000, Aldrich) were diluted in 10 mM tris(hydroxymethyl)aminomethane (Tris) solution at an overall concentration of 100 mg/mL with ratios of (1) 1:1, (2) 1:2, (3) 1:3, (4) 1:4, (5) 1:5, (6) 5:1, (7) 4:1, (8) 3:1 and (9) 2:1%(w/w). Numbered glass vials each filled with 1 mL of one of these solutions were incubated for 72 h after polymerisation was induced by adjusting the pH to 8.5 using 0.1 M NaOH. In samples 6-9 this resulted in the formation of a gel as seen in FIG. 8. The gel formation demonstrates that a reaction involving both the AMN and the PAA has occurred during the polymerisation reaction, with the PAA effectively acting as a crosslinker.

The formation of gels during AMN polymerisation in the presence of polyallylamine (PAA) demonstrates that a reaction involving both the AMN and the PAA has occurred during the polymerisation reaction, with the PAA effectively acting as a crosslinker. Hydrogels so formed are suitable for subsequent attachment to a substrate to thereby form a coating on at least a portion of the substrate. They may also be used as biological scaffolds, eg for wound healing.

EXAMPLE 9

Reactivity of AMN Coatings

Aminomalononitrile p-toluenesulfonate (AMN) (Aldrich, 98%) was dissolved in phosphate buffered saline (PBS) with a pH of 7.4 at a concentration of 100 mg/mL. To coat glass cover slip samples, the samples were incubated in this solution for 24 h after polymerisation was induced by adjusting the pH of the solution to 8.5 using 0.1 M sodium hydroxide (NaOH).

Subsequently, samples were washed five times with MilliQ™ water and then incubated overnight in MilliQ™ water before being air dried in a laminar flow cabinet. The presence of the coating was indicated by a light brown colour change. During the coating process samples were facing downwards to avoid the precipitation of polymer from solution.

Subsequently the freshly prepared samples were incubated in a solution of 100 mg 4-bromobenzyl bromide (BBB) (Aldrich) in 5 mL acetonitrile and 200 μL 0.1 M triethylamine (TEA) overnight at 37° C., followed by extensive washing in acetonitrile and MilliQ™ water and drying in a laminar flow cabinet. Control samples were analogously prepared under identical conditions using 100 mg 1,4-dibromobenzene (DBB).

The detection of bromine by XPS (Table 6) after reaction with 4-bromobenzyl bromide (BBB) demonstrates the reactivity of the AMN surface with this compound. Furthermore, the fact that no bromine is detected after reaction with 1,4-dibromobenzene (DBB) demonstrates that bromobenzene functional groups do not react with the AMN surface. In addition, the control experiment demonstrates that the washing procedures are sufficient for the complete removal of non-covalently bound BBB or DBB.

TABLE 6

XPS results obtained on AMN coated glass substrate materials before and after reaction with 4-bromobenzyl bromide (BBB) and 1,4-dibromobenzene (DBB). The average atomic ratios are presented (n = 3).

| Substrate | Br/C |
| --- | --- |
| Glass-AMN | — |
| Glass-AMN-BBB | 0.007 ± 0.001 |
| Glass-AMN-DBB | — |

The detection of bromine by XPS after reaction with 4-bromobenzyl bromide (BBB) demonstrates the reactivity of the AMN surface with this compound and its covalent immobilisation. Furthermore, the fact that no bromine is detected after reaction with 1,4-dibromobenzene (DBB) demonstrates that bromobenzene functional groups do not react with the AMN surface. In addition, the control experiment demonstrates that the washing procedures are sufficient for the complete removal of non-covalently bound BBB or DBB.

EXAMPLE 10

Deposition of Coatings Using Potassium Cyanide

Equimolar amounts of potassium cyanide (65.1 mg, KCN, Sigma) and ammonium chloride (53.5 mg, Sigma) were dissolved in 2 mL of MilliQ™ water. To coat glass samples, the samples were incubated in this solution at room temperature for 7 days. Subsequently, samples were washed five times with MilliQ™ water and then incubated overnight in MilliQ™ water before being air dried in a laminar flow cabinet. The presence of the coating was indicated by a light brown colour change.

Coatings were successfully deposited on glass substrates. Table 7 shows X-ray photoelectron spectroscopy (XPS) data collected before and after coating with the solution containing equimolar amounts of potassium cyanide and ammonium chloride. The XPS results clearly demonstrate the deposition of a coating, with a significant change in the elemental ratios. The most significant changes observed were an increase in the N/C ratio from 0.000 to 0.645 and a decrease in the Si/C ratio from 1.538 to 0.072. The latter reflects the almost complete attenuation of the Si signal from the underlying substrate material and a coating thickness close to the information depth of the XPS method.

TABLE 7

XPS results obtained on glass substrate materials before and after coating with a solution containing equimolar amounts of potassium cyanide (KCN) and ammonium chloride. The average atomic ratios observed are presented (n = 3).

| Substrate | O/C | N/C | Si/C |
| --- | --- | --- | --- |
| Glass | 2.961 ± 0.072 | — | 1.538 ± 0.047 |
| Glass-KCN | 0.231 ± 0.007 | 0.645 ± 0.003 | 0.072 ± 0.004 |

EXAMPLE 11

AMN Modified Coatings for Low Cell Attachment

Aminomalononitrile p-toluenesulfonate (AMN) (Aldrich, 98%) was dissolved in phosphate buffered saline (PBS) with a pH of 7.4 at a concentration of 50 mg/mL. Polymerisation was induced by adjusting the pH of the solution to 8.5 using 0.1 M sodium hydroxide (NaOH). 96 well plates (Nunclon Δ treated, Nunc, Denmark) were incubated for 24 h in the coating solution. During the coating process samples were facing downwards to avoid the precipitation of polymer from solution onto the surface of the wells. Subsequently, samples were washed five times with MilliQ™ water and then incubated overnight in MilliQ™ water before being air dried in a laminar flow cabinet. The presence of the coating was indicated by a light brown colour change.

The grafting of monomethoxy poly(ethylene glycol) aldehyde (PEG-ALD) (molecular weight 5,000, Shearwater Polymers, USA) was carried out in individual wells on AMN coated 96 well plates using 100 μL per well of a phosphate buffer solution (pH 6.2) containing 0.25% (w/v) PEG-ALD, 11% (w/v) potassium sulfate and 0.3% (w/v) sodium cyanoborohydride. The grafting reaction was carried out at 60° C. over 24 hours. Subsequently, samples were washed five times with MilliQ™ water and then incubated overnight in MilliQ™ water before being air dried in a laminar flow cabinet.

Table 8 shows XPS data collected on TCPS before and after coating with (i) AMN and (ii) AMN further modified with PEG-ALD. The significant increase in the O/C and N/C ratio in comparison to the TCPS substrate surface after deposition of the AMN coating demonstrates the successful deposition of this coating. Furthermore, the increase in the O/C ratio and the significant decrease in the N/C ratio after subsequent reaction with PEG-ALD demonstrates the successful grafting of PEG molecules on the AMN surface.

TABLE 8

XPS results obtained on TCPS substrate materials before and after coating with AMN and further modification with PEG-ALD. The average atomic ratios are presented (n = 3).

| Substrate | O/C | N/C |
|---|---|---|
| TCPS | 0.179 ± 0.020 | 0.014 ± 0.007 |
| AMN | 0.249 ± 0.007 | 0.559 ± 0.018 |
| AMN-PEG-ALD | 0.292 ± 0.007 | 0.428 ± 0.004 |

Prior to cell culture experiments, the plates were subjected to γ-sterilisation at a dose of 15 kGy (Steritech, Australia). L929 mouse fibroblasts (cell line ATCC-CCL-1, Rockville, USA) were used to investigate the cellular response to modified surfaces. Cells were cultured in minimum essential medium (MEM) containing 10% foetal bovine serum and 1% non-essential amino acids (Invitrogen, USA). After cell seeding in wells representing tissue culture polystyrene (TCPS) (Nunclon Δ treated, Nunc, USA), the AMN coating and the PEG-ALD modified AMN coating at a density of $2.5 \times 10^4$ cells/cm$^2$, samples were incubated for 24 hours at 37° C. in humidified air containing 5% $CO_2$.

Subsequently substrates were washed once with minimum essential medium (MEM) before a solution consisting of 100 μL phenazine methosulfate (PMS) solution (0.92 mg/mL in DPBS), 2 mL 3-(4,5-dimethylthiazol-2-yl)-2,5-diphenyltetrazolium bromide (MTS) solution (2 mg/mL in DPBS), and 10 mL MEM was added. The substrates were incubated for 3 hours at 37° C. in humidified air containing 5% $CO_2$ before a colorimetric readout was performed at 490 nm and 655 nm.

Figure 9:
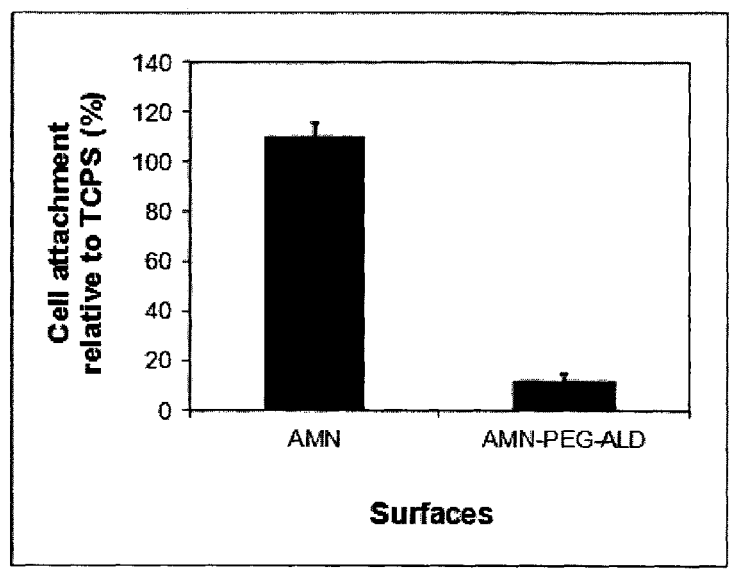
FIG. 9: L929 mouse fibroblast attachment after 24 hours obtained from MTS tests relative to TCPS in % (n=8).

FIG. 9 shows the MTS assay results obtained on the different surfaces. Cell attachment was enhanced on AMN coated surfaces relative to TCPS. Most importantly, cell attachment was reduced significantly on PEG-ALD modified AMN coated surfaces relative to the TCPS and the AMN surfaces.

The data clearly demonstrate that PEG-ALD molecules can be surface immobilised on AMN coatings using a reductive amination reaction. Furthermore, the PEG grafting reaction can be used to modulate the cellular response. Importantly, the PEG grafting density achieved in the grafting reaction was demonstrated to be sufficient to significantly reduce cell attachment. Overall the data demonstrate that PEG-ALD modified AMN coatings can be used for applications where substantially reduced cell attachment is required.

EXAMPLE 12

Coatings Having Antimicrobial Properties

Aminomalononitrile p-toluenesulfonate (AMN) (Aldrich, 98%) was dissolved in phosphate buffered saline (PBS) with a pH of 7.4 at a concentration of 100 mg/mL. Polymerisation was induced by adjusting the pH of the solution to 8.5 using 0.1 M sodium hydroxide (NaOH). 96 well plates having an Ultra-low attachment (ULA) coating (Corning, USA) were incubated for 24 h in the coating solution. Subsequently, samples were washed five times with MilliQ™ water and then incubated overnight in MilliQ™ water before being air dried in a laminar flow cabinet. The presence of the coating was indicated by a light brown colour change. During the coating process samples were facing downwards to avoid the precipitation of polymer from solution.

Subsequently, an aqueous solution containing silver nitrate ($AgNO_3$) was added to individual wells with concentrations ranging from $10^{-9}$ M to $10^{-2}$ M and incubated over 24 hours. The wells were then washed at least three times using MilliQ™ water and a pipette and finally filled with 360 μL MilliQ™ water before soaking for 24 hours and drying in air in a laminar flow cabinet. XPS experiments confirmed the deposition of silver. The average Ag/C ratio observed were 0 for less than $10^{-5}$ M, 0.002 for $10^{-5}$ M, 0.025 for $10^{-4}$ M, 0.065 for $10^{-3}$ M, and 0.096 for $10^{-2}$ M $AgNO_3$ in solution. Prior to biofilm testing, the plates were subjected to γ-sterilisation at a dose of 15 kGy (Steritech, Australia).

Figure 10:
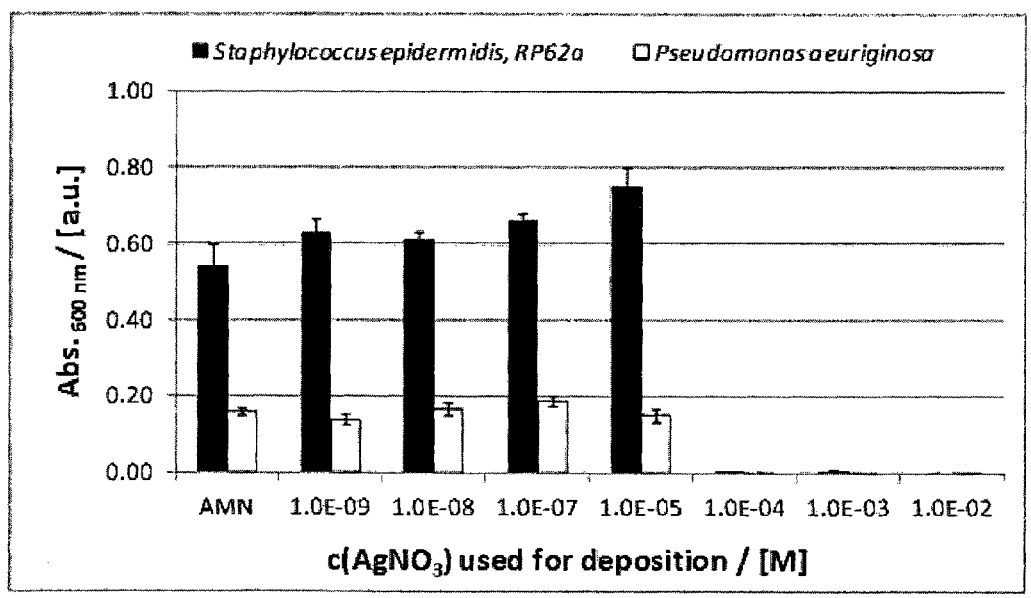
FIG. 10: Crystal violet based quantification of biofilm formation on AMN coatings incorporating silver for *S. epidermidis* and *P. aeruginosa* depending on the solution concentration of $AgNO_3$ used for deposition of silver.

A static biofilm assay was performed using a clinically relevant gram-positive (*Staphylococcus epidermidis* RP62a) and gram-negative (*Pseudomonas aeruginosa*) strain. Broth cultures were grown from single colonies overnight at 37° C. using Tryptic Soy Broth (TSB-medium) for *S. epidermidis* and Luria Broth (LB-medium) for *P. aeruginosa*. The bacterial cultures were then diluted to $10^7$ Cell forming units (CFU)/mL using the respective media for dilution. 100 μL of the diluted broth cultures were then used to inoculate each well (four repetitions for each silver concentration). Identical experiments representing negative controls were also performed using the two different types of media without bacteria (four repetitions for each silver concentration). The plates were incubated for 18 hours at 37° C. Subsequently, planktonic bacteria were removed and the wells washed three times with 200 μL PBS buffer followed by drying in air. Biofilms were then stained by incubating each well with 100 μL 0.1% (w/v) crystal violet solution. The staining solution was removed after 15 minutes and the plates were repeatedly (3 times) submerged in water to wash off excess dye followed by drying in air. For the purpose of quantification by UV spectroscopy, the dye incorporated in the biofilm was dissolved by adding 200 μL of 5% (v/v) acetic acid in ethanol and occasional shaking for 15 minutes. 100 μL of this solution were then transferred to a fresh 96-well plate and the absorption measured at 600 nm. Absorptions were averaged and background corrected using the averaged readouts from negative controls. FIG. 10 shows the biofilm quantification data obtained in this assay. The results demonstrate that biofilm formation for both strains is prevented effectively at an $AgNO_3$ concentration of 0.1 mM and above.

EXAMPLE 13

Coatings Produced by Solvent Casting of Neutralised AMN 1 g of Aminomalononitrile p-toluenesulfonate (AMN) (Aldrich, 98%) was dissolved in 6 mL of MilliQ™ water. 6 mL of a saturated sodium bicarbonate solution was then added to reach a pH of 9.0. This aqueous solution was then extracted with diethylether. The organic phase, which showed a pale yellow colour was then separated from the aqueous phase. Subsequently the amount of solvent was reduced under vacuum using a rotary evaporator and the remaining solution was cast onto glass substrates, resulting in a brown coating after incubation over 16 hours at room temperature or after incubation for 5 minutes at 110° C., respectively. Samples were then washed five times with MilliQ™ water before being air dried in a laminar flow cabinet.

This coating process is based on isolating the free base of the aminomalononitrile in an organic solvent followed by its spontaneous polymerisation. Coatings produced in this way were characterised by XPS. Table 9 shows XPS data collected on glass substrates before and after coating with the solvent cast neutralised AMN coating at different temperatures. In each case, the XPS results clearly demonstrate the deposition of a coating, with a significant change in the elemental composition in comparison to an untreated glass substrate. However, the fact that a relatively high Si/C ratio was observed suggests that the coating thickness was below the XPS information depth of approximately 10 nm.

TABLE 9

XPS results obtained on glass substrates before and after solvent casting of neutralised AMN and incubation at different temperatures. The average atomic ratios are presented (n = 3).

| Substrate | O/C | N/C | Other |
|---|---|---|---|
| Glass | 2.857 ± 0.048 | 0.036 ± 0.005 | 1.203 ± 0.007 (Si/C) |
| Glass-AMN (solvent cast) Room temperature | 0.611 ± 0.023 | 0.472 ± 0.020 | 0.302 ± 0.009 |
| Glass-AMN (solvent cast) 110° C. | 0.832 ± 0.090 | 0.427 ± 0.059 | 0.492 ± 0.085 |

These results demonstrate that coatings can be obtained in a simple solvent casting process from an organic solvent containing neutralised AMN.

EXAMPLE 14

Coatings Formed Using Diaminomaleonitrile (DAMN)

0.5 g of Diaminomaleonitrile (DAMN) was refluxed in 50 mL of MilliQ™ water for 24 in a flask containing a glass sample. Subsequently, the glass sample was washed five times with MilliQ™ water and then incubated overnight in MilliQ™ water before being air dried in a laminar flow cabinet. The presence of a coating on the glass substrate was indicated by a light brown colour change. Table 10 shows the XPS results obtained on the DAMN coated glass sample in comparison to results obtained on an untreated glass sample. The XPS results clearly demonstrate the deposition of a coating, with a significant change in the elemental ratios after coating composition. The fact that only a small Si/C ratio was observed on the DAMN coated surface also points to a consistent coating with a thickness on the order of or exceeding the XPS information depth of approximately 10 nm.

TABLE 10

XPS results obtained on glass substrates before and after deposition of a DAMN coating. The average atomic ratios are presented (n = 3).

| Substrate | O/C | N/C | Other |
|---|---|---|---|
| Glass | 2.857 ± 0.048 | 0.036 ± 0.005 | 1.203 ± 0.007 (Si/C) |
| Glass-DAMN | 0.317 ± 0.007 | 0.508 ± 0.011 | 0.021 ± 0.011 |

These results demonstrate that coatings can be obtained in a simple process from Diaminomaleonitrile (DAMN).

EXAMPLE 15

Cytotoxicity of AMN Coatings

Aminomalononitrile p-toluenesulfonate (AMN) (Aldrich, 98%) was dissolved in phosphate buffered saline (PBS) with a pH of 7.4 at a concentration of 100 mg/mL. Polymerisation was induced by adjusting the pH of the solution to 8.5 using 0.1 M sodium hydroxide (NaOH). 24 well plates (Nunclon Δ treated, Nunc, Denmark) were incubated for 24 h in the coating solution. During the coating process samples were facing downwards to avoid the precipitation of polymer from solution onto the surface of the wells. Subsequently, samples were washed five times with MilliQ™ water and then incubated overnight in MilliQ™ water before being air dried in a laminar flow cabinet. The presence of the coating was indicated by a light brown colour change.

Cytotoxicity testing was performed according to the international standard ISO10993-5 (Biological evaluation of medical devices—Part 5: Tests for in vitro cytotoxicity and Part 12: Sample preparation and reference materials). The volume of the extraction solution was determined by the surface area of the base and side wall of the well (0.8 mL per well), giving a depth of 6 mm for the extraction fluid. The extraction solution was serum free medium (SFM). The extraction solvent was incubated on the samples for 66 hours at 37° C. with agitation on a rocking platform set to 20 rpm.

Subsequently the extraction solutions from each well were brought to room temperature and the extraction fluid from each well separately serially diluted 1 in 2 using SFM as the diluent to give a range of test solutions from 100%, 50% etc. to 0.39%. of the original extraction solution. Standard control solutions included SFM alone, SFM containing 5% PBS, and SFM containing 5% DMSO. All solutions were prepared in sterile 96 well plates (Nunclon Δ treated, Nunc, Denmark) in quadruplicate.

In parallel, L929 mouse fibroblast cells were seeded at a density of $2\times10^4$ cells/well into 96 well plates (Nunclon Δ treated, Nunc, USA) in 100 μL of freshly prepared serum containing medium. The cells were incubated for 24 hours at 37° C. in humidified air containing 5% $CO_2$.

Following removal of the serum containing medium from all of the wells, these were washed twice with 150 μL of SFM after which 100 μL of test solution (100%, 50% etc. to 0.39%. of the original extraction solution) or control solution (SFM, SFM containing 5% PBS or SFM containing 5% DMSO) was added to individual wells. The plates were then incubated for a further 20 hours at 37° C.

Figure 11:
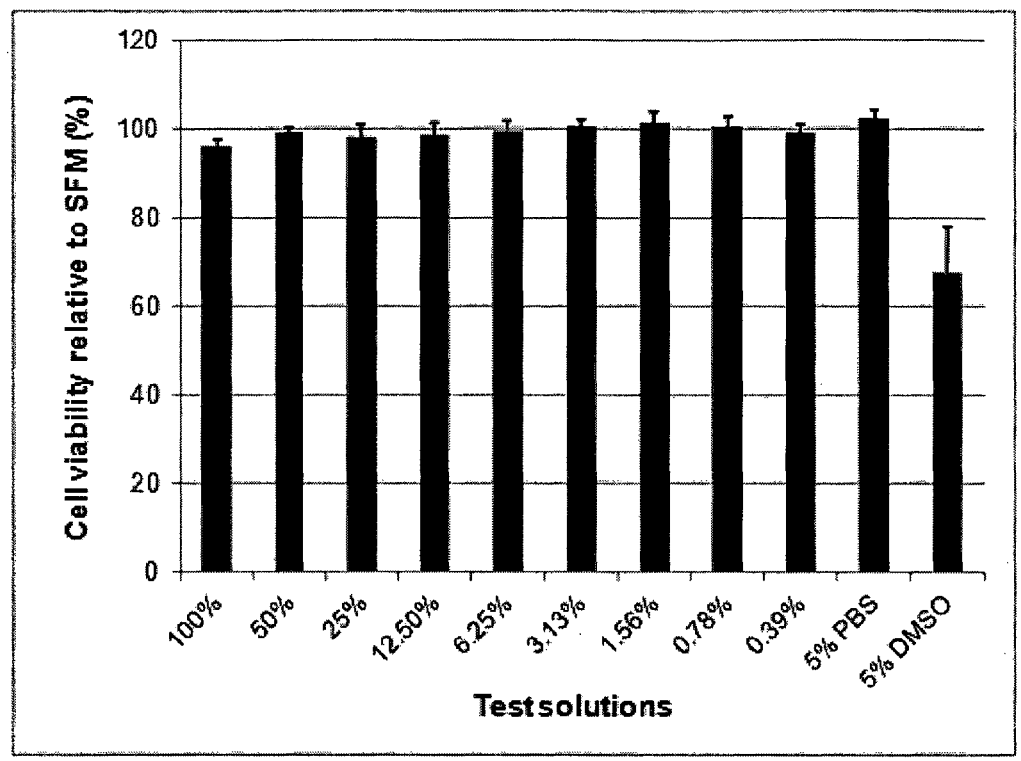
FIG. 11: L929 cell viability determined relative to serum free medium (SFM) in %. Results were recorded using an MTS assay after 20 hours of incubation with a serial dilution (100%-0.39%) of SFM-based extraction solutions that had been in contact with AMN coated surfaces for 66 hours. SFM containing 5% PBS and 5% DMSO served as non-toxic and toxic controls, respectively.

To quantify the number of metabolically active cells, a colorimetric MTS assay was performed using 3-(4,5-dimethylthiazol-2-yl)-5(3-carboxymethoxphenyl)-2-(4-sulphophenyl)-2H-tetrazolium (Promega). At 20 hours, a fresh working solution of MTS reagent was prepared as per the manufacturer's instructions. The test and control solutions were removed from the plates and 100 μL of MTS solution added. The plates were then incubated for 3 hours at 37° C. Subsequently the plates were read using an ELISA plate reader (BioTek, USA). FIG. 11 shows the quantitative evaluation of cytotoxicity using the MTS assay with serial dilutions (100%-0.39%) of SFM-based extraction solutions originating from 4 different samples, each of which were investigated in multiple replicates. The MTS assay was also carried out on the same overall number of replicates using SFM, SFM containing 5% PBS and SFM containing 5% DMSO. None of the extraction solutions showed a cytotoxic response at any dilution, while the control samples gave the expected responses. Therefore the AMN coatings are not considered cytotoxic.

Qualitative evaluation of the plates by visual inspection showed that none of the wells containing SFM and 5% PBS showed any reactivity to the solution with all cells having an attached, flattened healthy appearance. Also none of the test solutions showed any reactivity at any dilution with all cells having an attached, flattened healthy appearance (Grade 0). In comparison, wells containing 5% DMSO showed a mild reaction with approximately 25% of cells having a rounded appearance (Grade 2).

The lack of cytotoxicity underlines the suitability of AMN coatings in a broad range of biomedical applications.

EXAMPLE 16

Spatial Control Over the Biological Response Using AMN Coatings

Substrate samples with a size of approximately 4 cm² were cut out of 6 well plates having an Ultra-low attachment (ULA) coating (Corning, USA).

Aminomalononitrile p-toluenesulfonate (AMN) (Aldrich, 98%) was dissolved in phosphate buffered saline (PBS) with a pH of 7.4 at a concentration of 100 mg/mL. Polymerisation was induced by adjusting the pH of the solution to 8.5 using 0.1 M sodium hydroxide (NaOH). After 30 minutes incubation, 100 μL of this solution was transferred to individual wells of a 96 well plate, which was used as a source plate in a microarray printer (NanoPrint LM60 microarrayer, ArrayIt, USA). After contact printing of the solution onto the ULA coated samples in an array pattern using pins with a diameter of 375 μm, samples were air dried in a laminar flow cabinet over 48 hours. Subsequently, samples were washed three times with MilliQ™ water before again being air dried in a laminar flow cabinet. Prior to cell seeding, samples were subjected to γ-sterilisation at a dose of 15 kGy (Steritech, Australia).

L929 mouse fibroblasts (cell line ATCC-CCL-1, Rockville, USA) were used to investigate the cellular response to the patterned surface chemistry. Cells were cultured in minimum essential medium (MEM) containing 10% foetal bovine serum and 1% non-essential amino acids (Invitrogen, USA). After cell seeding at a density of $2.5 \times 10^4$ cells/cm², samples were incubated for 16 hours at 37° C. in humidified air containing 5% $CO_2$.

Figure 12:
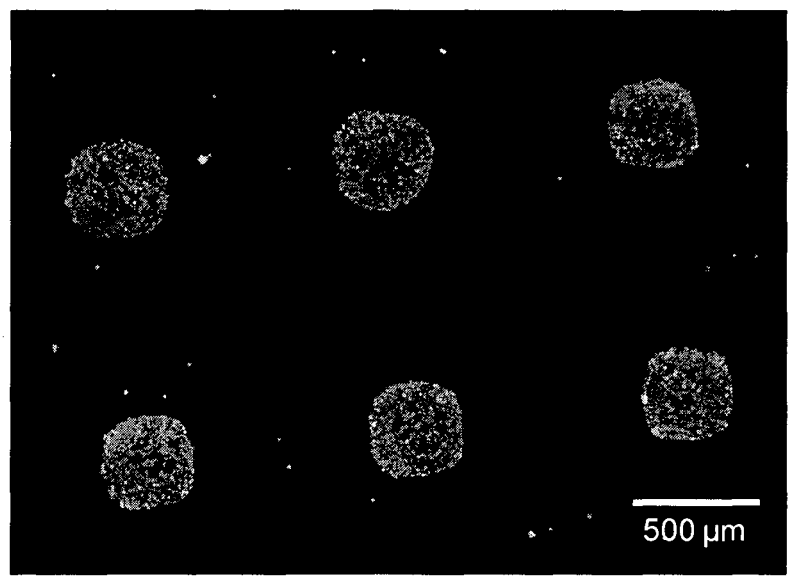
FIG. 12: L929 cell response to a patterned surface chemistry representing cell adhesive AMN coated areas on a non-cell adhesive Ultra-low attachment (ULA) coating (Corning, USA) after 24 hours.

After washing samples with medium, a Molecular Probes live/dead assay was performed, which resulted in live, attached cells being stained green and dead, attached cells being stained red. Samples were then imaged using a Nikon TE 2000 Fluorescent Microscope. The cell attachment pattern observed in FIG. 12 demonstrates that cells were only able to attach to the substrate in areas where the AMN coating is present, while cell attachment was prevented on the ULA background coating. Cell attachment exactly followed the pattern provided by the microarray printing process. Furthermore, all cells attached to the AMN coated areas showed green fluorescence, indicating live cells and therefore negligible cytotoxicity.

These results demonstrate that spatial control over biological responses such as cell attachment can be achieved using AMN coating deposition.

EXAMPLE 17

Grafting of Polymers onto AMN Coatings

Aminomalononitrile p-toluenesulfonate (AMN) (Aldrich, 98%) was dissolved in phosphate buffered saline (PBS) with a pH of 7.4 at a concentration of 50 mg/mL. Polymerisation was induced by adjusting the pH of the solution to 8.5 using 0.1 M sodium hydroxide (NaOH). 96 well plates (Nunclon Δ treated, Nunc, Denmark) were incubated for 24 h in the coating solution. During the coating process samples were facing downwards to avoid the precipitation of polymer from solution onto the surface of the wells. Subsequently, samples were washed five times with MilliQ™ water and then incubated overnight in MilliQ™ water before being air dried in a laminar flow cabinet. The presence of the coating was indicated by a light brown colour change.

Freshly AMN-coated multiwell substrates were then incubated with solutions containing either an amine-terminated dendrimer (DMR, Generation 4, Sigma-Aldrich) or polyallylamine (ALA, molecular weight 70,000, Sigma-Aldrich) to increase the number of amine functional groups available at the surface. AMN coated 96-well plate surfaces were incubated for 24 hours with a volume of 100 μL per well containing 0.30% (w/v) of DMR or 0.25% (w/v) of ALA, respectively in PBS at pH 6. Subsequently, samples were washed five times with MilliQ™ water and then incubated overnight in MilliQ™ water before being air dried in a laminar flow cabinet.

The grafting of monomethoxy poly(ethylene glycol) aldehyde (PEG-ALD) (molecular weight 5,000, Shearwater Polymers, USA) was carried out in individual wells on AMN-DMR and AMN-ALA coated 96 well plates using 100 μL per well of a phosphate buffer solution (pH 6.2) containing 0.25% (w/v) PEG-ALD, 11% (w/v) potassium sulfate and 0.3% (w/v) sodium cyanoborohydride. The grafting reaction was carried out at 60° C. over 24 hours. Subsequently, samples were washed five times with MilliQ™ water and then incubated overnight in MilliQ™ water before being air dried in a laminar flow cabinet.

The significant increase in the O/C and N/C ratio in comparison to the TCPS substrate surface after deposition of the AMN coating demonstrates the successful deposition of this coating (Table 11). The successful deposition of DMR and ALA on the AMN surface is also reflected by significant changes in particular in the N/C ratio compared to the AMN coated substrate. Furthermore, the significant changes in the O/C and N/C ratios following the grafting of PEG-ALD on both AMN-DMR and AMN-ALA coated surfaces demonstrates the successful grafting of PEG molecules on these amine-rich surfaces (Table 11).

TABLE 11

XPS results obtained on TCPS substrate materials before and after coating with AMN, immobilisation of DMR or ALA and further modification with PEG-ALD. The average atomic ratios are presented (n = 3).

| Substrate | O/C | N/C |
| --- | --- | --- |
| TCPS | 0.179 ± 0.020 | 0.014 ± 0.007 |
| AMN | 0.249 ± 0.007 | 0.559 ± 0.018 |
| AMN-DMR | 0.221 ± 0.009 | 0.454 ± 0.031 |
| AMN-DMR-PEG-ALD | 0.356 ± 0.013 | 0.321 ± 0.019 |
| AMN-ALA | 0.225 ± 0.010 | 0.462 ± 0.033 |
| AMN-ALA-PEG-ALD | 0.408 ± 0.056 | 0.127 ± 0.030 |

Prior to cell culture experiments, the plates were subjected to γ-sterilisation at a dose of 15 kGy (Steritech, Australia). L929 mouse fibroblasts (cell line ATCC-CCL-1, Rockville, USA) were used to investigate the cellular response to modified surfaces. Cells were cultured in minimum essential medium (MEM) containing 10% foetal bovine serum and 1% non-essential amino acids (Invitrogen, USA). After cell seeding in wells representing tissue culture polystyrene (TCPS) (Nunclon Δ treated, Nunc, USA), the AMN coating and the PEG-ALD modified AMN coating at a density of $2.5 \times 10^4$ cells/cm², samples were incubated for 24 hours at 37° C. in humidified air containing 5% $CO_2$.

Subsequently substrates were washed once with minimum essential medium (MEM) before a solution consisting of 100 µL phenazine methosulfate (PMS) solution (0.92 mg/mL in DPBS), 2 mL 3-(4,5-dimethylthiazol-2-yl)-2,5-diphenyltetrazolium bromide (MTS) solution (2 mg/mL in DPBS), and 10 mL MEM was added. The substrates were incubated for 3 hours at 37° C. in humidified air containing 5% $CO_2$ before a colorimetric readout was performed at 490 nm and 655 nm.

Figure 13:
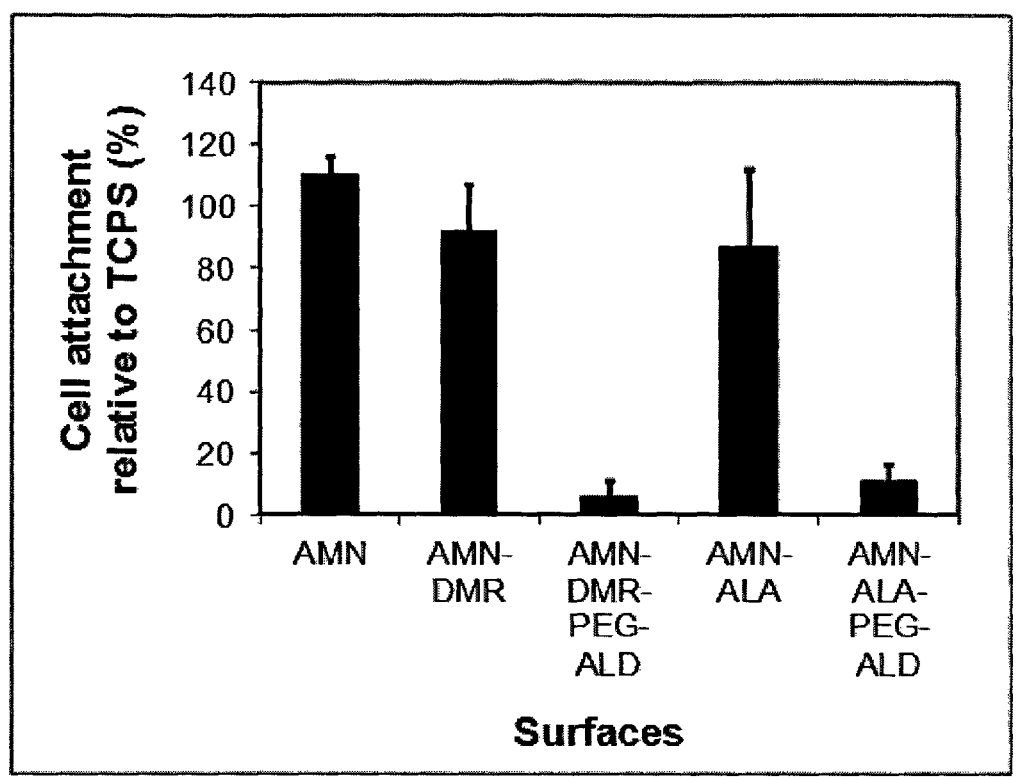
FIG. 13: L929 mouse fibroblast attachment after 24 hours obtained from MTS tests relative to TCPS in % (n=8).

FIG. 13 shows the MTS assay results obtained on the different surfaces. Cell attachment was enhanced on AMN coated surfaces relative to TCPS. High cell attachment was also observed on AMN-DMR and AMN-ALA coated surfaces. In comparison, a significant reduction of cell attachment was observed on AMN-DMR and AMN-ALA coated surfaces that had been grafted with PEG-ALD polymer.

The data clearly demonstrate that polyamines such as DMR and ALA can be immobilised on AMN coated surfaces. In addition, the results demonstrate that polyamines such as DMR and ALA can be used as an interlayer for the subsequent grafting of polymers such as PEG-ALD, which in turn may be used to modulate the cellular response. Importantly, the PEG grafting density achieved in the grafting reactions was demonstrated to be sufficient to significantly reduce cell attachment.

The invention claimed is:

1. A process of coating at least a portion of a substrate surface comprising contacting the substrate surface with hydrogen cyanide monomeric units in a liquid solution, adding base to provide conditions permitting polymerisation of the hydrogen cyanide monomeric units, and forming a polymer coating on the at least a portion of the substrate surface.

2. A process according to claim 1, wherein the hydrogen cyanide monomeric units are provided in an aqueous solution and the base increases the pH of the aqueous solution to provide the conditions permitting polymerisation.

3. A process according to claim 1, wherein the base provides the conditions permitting polymerisation of the hydrogen cyanide monomeric units by neutralising protonated hydrogen cyanide monomeric units to form neutralised hydrogen cyanide monomeric units.

4. A process according to claim 1, wherein the hydrogen cyanide monomeric units are selected from the group consisting of one or more of hydrogen cyanide, iminoacetonitrile, aminomalononitrile, diaminomaleonitrile, aminoacetonitrile, azidoacetonitrile and isomers of any one of these.

5. A process according to claim 1, wherein the hydrogen cyanide monomeric units are selected from the group consisting of one or more of hydrogen cyanide, aminomalononitrile, aminoacetonitrile, and isomers of any one of these.

6. A process according to claim 1, wherein the hydrogen cyanide monomeric units consist essentially of hydrogen cyanide or aminomalononitrile.

7. A process according to claim 3, wherein the base neutralises the protonated hydrogen cyanide monomeric units in an aqueous solution, and wherein the process further comprises
extracting the neutralised hydrogen cyanide monomeric units from the aqueous solution using an organic solvent, wherein
the substrate surface is contacted with the organic solvent comprising the neutralised hydrogen cyanide monomeric units
to form the polymer coating on the at least a portion of the surface.

8. A process according to claim 1, wherein the liquid solution of hydrogen cyanide monomeric units comprises one or more of fillers, pigments, wetting agents, viscosity modifiers, stabilizers, anti-oxidants, ligands, cross-linking agents, co-monomers, nanoparticles, biopolymers, and metals.

9. A process according to claim 1, wherein the process has a further step of contacting the polymer coating with one or more reactive moieties, wherein the one or more reactive moieties reacts with and is bound to the polymer coating.

10. A process according to claim 1, wherein the process has a further step of grafting a further polymer to the polymer coating by contacting the surface with the further polymer, wherein the further polymer reacts with and is bound to the polymer coating or any reactive moieties attached to the polymer coating.

11. A process according to claim 2, wherein the pH is increased to above 7 and below 12.

12. A process according to claim 2, wherein the pH is increased to from 8 to 9.

13. A process according to claim 1, wherein the hydrogen cyanide monomeric units are provided as a stabilised salt of an acid selected from the group consisting of p-toluenesulfonic acid, hydrochloric acid, sulphuric acid or other acids.

14. A process according to claim 1, wherein the liquid solution is acidic and comprises an acid selected form the group consisting of p-toluenesulfonic acid, methane sulfonic acid, trifluoroacetic acid, sulphuric acid, hydrochloric acid, nitric acid, triflic acid, trifluoroacetic acid, acetic acid, phosphoric acid, and perchloric acid.

15. A process according to claim 14, wherein the acid is p-toluenesulfonic acid.

16. A process according to claim 9, wherein the one or more reactive moieties comprises a silver salt.

17. A process according to claim 1, wherein the substrate is of organic material.

18. A process according to claim 1, wherein the liquid solution of hydrogen cyanide monomeric units further comprises a co-monomer that provides additional functionalisation of the polymer coating.

19. A process according to claim 1, wherein the liquid solution of hydrogen cyanide monomeric units further comprises a co-monomer wherein the co-monomer comprises functional groups selected from the group consisting of amines, thiols, nitriles, aldehydes, imidazoles, azides, polyhexamethylene dithiocarbonate, hydrogen, hydroxyls, carboxylic acids, carboxylic esters, carboxamides, alkyl halides, benzylic halides, epoxides, thioepoxides, isocyanates and combinations thereof.

20. A process according to claim 1, wherein the liquid solution of hydrogen cyanide monomeric units comprises a co-monomer selected from the group of compounds containing primary amines, secondary amines, thiols, acrylates, methacrylates, epoxides, thioepoxides, isothiocyanates, alkyl halides and arylmethyl halides.

21. A process according to claim 1, wherein the hydrogen cyanide monomeric units consist essentially of multimers of hydrogen cyanic acid.

22. A process according to claim 1, wherein the hydrogen cyanide monomeric units consist essentially of aminomalononitrile.

23. A process according to claim 1, wherein the base is soluble in the liquid solution and is selected from the group consisting of sodium hydroxide, potassium hydroxide, ammonium hydroxide, calcium hydroxide, magnesium hydroxide, barium hydroxide, aluminium hydroxide, ferrous hydroxide, ferric hydroxide, zinc hydroxide, lithium hydroxide, 2-amino-2-hydroxymethyl-propane-1,3-diol, and ammonium di-methyl amine.

24. A process according to claim 1, further comprising contacting the polymer coating with cells to form a surface having adherent cells.

25. A process of coating at least a portion of a substrate surface comprising contacting the substrate surface with hydrogen cyanide monomeric units comprising aminomalononitrile in a liquid solution, adding a soluble base to provide conditions permitting polymerisation of the hydrogen cyanide monomeric units, and forming a polymer coating on the at least a portion of the substrate surface.

* * * * *